(12) United States Patent
Kim et al.

(10) Patent No.: US 11,847,292 B2
(45) Date of Patent: Dec. 19, 2023

(54) METHOD OF PROCESSING CONTENT AND ELECTRONIC DEVICE THEREOF

(71) Applicant: Samsung Electronics Co., Ltd., Suwon-si (KR)

(72) Inventors: Kyung-Hwan Kim, Yongin-si (KR); Dong-Jeon Kim, Anyang-si (KR); Jin-Hong Jeong, Yongin-si (KR); Hye-Soon Jeong, Chilgok-gun (KR); Se-Jun Song, Seoul (KR); Yo-Han Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/097,587

(22) Filed: Nov. 13, 2020

(65) Prior Publication Data
US 2021/0064193 A1    Mar. 4, 2021

Related U.S. Application Data

(63) Continuation of application No. 14/843,387, filed on Sep. 2, 2015, now abandoned.

(30) Foreign Application Priority Data

Sep. 2, 2014  (KR) .................. 10-2014-0116514

(51) Int. Cl.
*G06F 3/0481* (2022.01)
*G06F 3/0482* (2013.01)
*G06F 3/04842* (2022.01)
*H04L 67/06* (2022.01)

(52) U.S. Cl.
CPC .......... *G06F 3/0481* (2013.01); *G06F 3/0482* (2013.01); *G06F 3/04842* (2013.01); *H04L 67/06* (2013.01)

(58) Field of Classification Search
CPC .. G06F 3/0481; G06F 3/0482; G06F 3/04842; H04L 67/06
See application file for complete search history.

(56) References Cited

U.S. PATENT DOCUMENTS 6,178,270 B1    1/2001  Taylor et al.
6,760,728 B1    7/2004  Osborn
(Continued)

FOREIGN PATENT DOCUMENTS

CN    101243706 A    8/2008
CN    102567108 A    7/2012
(Continued)

OTHER PUBLICATIONS

Chinese Office Action dated Feb. 2, 2021, issued in Chinese Patent Application No. 201580047151.5.
(Continued)

*Primary Examiner* — Jeremy L Stanley
(74) *Attorney, Agent, or Firm* — Jefferson IP Law, LLP

(57) ABSTRACT

A method for processing contents at an electronic device is provided. The method includes generating a first content corresponding to a user input applied to content via the electronic device, and displaying a floating user interface (UI), which displays first scrap information on the first content, on a screen of the electronic device.

22 Claims, 24 Drawing Sheets

(56) References Cited

U.S. PATENT DOCUMENTS

| | | | |
|---|---|---|---|
| 7,559,033 B2* | 7/2009 | Boss | G06F 9/543 715/769 |
| 7,568,080 B2 | 7/2009 | Prahlad et al. | |
| 7,600,198 B2 | 10/2009 | Gunderson et al. | |
| 7,954,047 B2* | 5/2011 | Berger | G06F 40/18 715/220 |
| 8,650,507 B2 | 2/2014 | Westerman | G06F 3/04883 715/863 |
| 8,723,824 B2 | 5/2014 | Myers et al. | |
| 9,092,428 B1 | 7/2015 | Zhang et al. | |
| 9,098,127 B2* | 8/2015 | Rana | G06F 3/033 |
| 9,165,406 B1 | 10/2015 | Gray et al. | |
| 9,170,714 B2 | 10/2015 | Wilhelm Martens et al. | |
| 9,201,868 B1 | 12/2015 | Zhang et al. | |
| 9,429,447 B2 | 8/2016 | Son et al. | |
| 9,645,732 B2* | 5/2017 | Butcher | G06F 3/0488 |
| 10,409,465 B2* | 9/2019 | Lei | G06F 3/0483 |
| 10,915,698 B2* | 2/2021 | Hicks | G06F 3/0488 |
| 2003/0103082 A1* | 6/2003 | Carroll | G06F 40/166 715/769 |
| 2006/0284981 A1 | 12/2006 | Erol et al. | |
| 2007/0044013 A1 | 2/2007 | Hyatt | |
| 2008/0002888 A1 | 1/2008 | Yuan | |
| 2008/0082932 A1 | 4/2008 | Beumer | |
| 2008/0086700 A1* | 4/2008 | Rodriguez | H04M 1/72436 715/804 |
| 2009/0077497 A1 | 3/2009 | Cho et al. | |
| 2009/0125848 A1* | 5/2009 | Keohane | G06F 3/04883 715/863 |
| 2010/0122160 A1* | 5/2010 | Chirakansakcharoen | G06F 40/166 715/256 |
| 2010/0195131 A1 | 8/2010 | Nakata | |
| 2010/0199232 A1* | 8/2010 | Mistry | G06F 3/0425 715/863 |
| 2011/0035145 A1 | 2/2011 | Yamasaki | |
| 2011/0081083 A1 | 4/2011 | Lee et al. | |
| 2011/0107206 A1* | 5/2011 | Walsh | G06F 40/247 715/256 |
| 2011/0231796 A1* | 9/2011 | Vigil | G06F 3/04883 715/810 |
| 2012/0010995 A1 | 1/2012 | Skirpa et al. | |
| 2012/0042272 A1 | 2/2012 | Hong et al. | |
| 2012/0072833 A1 | 3/2012 | Song et al. | |
| 2012/0110486 A1* | 5/2012 | Sirpal | G06F 1/1641 715/770 |
| 2012/0124524 A1* | 5/2012 | Frank Szarfman | G06F 40/166 715/843 |
| 2012/0131497 A1 | 5/2012 | Jitkoff | |
| 2012/0144293 A1* | 6/2012 | Kim | G06F 3/04817 715/255 |
| 2012/0159334 A1* | 6/2012 | Messerly | G06F 9/543 715/733 |
| 2012/0229397 A1* | 9/2012 | Cho | G06F 3/04842 345/173 |
| 2012/0302167 A1 | 11/2012 | Yun et al. | |
| 2013/0011055 A1 | 1/2013 | You et al. | |
| 2013/0013400 A1 | 1/2013 | Kim | |
| 2013/0013987 A1 | 1/2013 | Kim | |
| 2013/0046935 A1* | 2/2013 | Ramanathan | G06F 16/9574 711/119 |
| 2013/0104032 A1 | 4/2013 | Lee et al. | |
| 2013/0104037 A1 | 4/2013 | Doan et al. | |
| 2013/0117025 A1 | 5/2013 | Park et al. | |
| 2013/0187873 A1 | 7/2013 | Jeong | |
| 2013/0232408 A1* | 9/2013 | Xu | G06F 3/0488 715/256 |
| 2013/0246039 A1* | 9/2013 | Duneau | G06T 11/60 704/2 |
| 2013/0254714 A1 | 9/2013 | Shin et al. | |
| 2013/0304815 A1 | 11/2013 | Puente et al. | |
| 2013/0332878 A1 | 12/2013 | Sung | |
| 2013/0346872 A1 | 12/2013 | Scott et al. | |
| 2013/0346914 A1 | 12/2013 | Jeong | |
| 2014/0053061 A1 | 2/2014 | Chasen et al. | |
| 2014/0062962 A1 | 3/2014 | Jang et al. | |
| 2014/0071171 A1* | 3/2014 | Mcgowan | G06F 3/0883 345/661 |
| 2014/0075355 A1* | 3/2014 | Kim | G06F 3/0484 715/769 |
| 2014/0109004 A1* | 4/2014 | Sadhvani | G06F 3/04842 715/810 |
| 2014/0109019 A1* | 4/2014 | Rana | G06F 3/033 715/863 |
| 2014/0123045 A1 | 5/2014 | Wilhelm Martens et al. | |
| 2014/0132535 A1 | 5/2014 | Kim | |
| 2014/0136977 A1 | 5/2014 | Arun et al. | |
| 2014/0141836 A1 | 5/2014 | Rozumyanskiy et al. | |
| 2014/0143664 A1* | 5/2014 | Tsang | G06F 9/543 715/256 |
| 2014/0143681 A1* | 5/2014 | Chandra | H04L 51/08 715/752 |
| 2014/0157169 A1* | 6/2014 | Kikin-Gil | G06F 3/04886 715/770 |
| 2014/0168095 A1* | 6/2014 | Mesguich Havilio | G06F 3/04883 345/173 |
| 2014/0173460 A1 | 6/2014 | Kim | |
| 2014/0223372 A1 | 8/2014 | Dostie et al. | |
| 2014/0258838 A1 | 9/2014 | Evers et al. | |
| 2014/0280132 A1* | 9/2014 | Auger | G06F 9/543 707/736 |
| 2014/0282106 A1 | 9/2014 | Smith et al. | |
| 2014/0304599 A1 | 10/2014 | Alexandersson | |
| 2014/0313143 A1 | 10/2014 | Jung et al. | |
| 2014/0324943 A1* | 10/2014 | Antipa | G06F 3/0486 709/203 |
| 2014/0337699 A1* | 11/2014 | Tang | G06F 3/04842 715/205 |
| 2014/0372952 A1 | 12/2014 | Otero et al. | |
| 2015/0012862 A1* | 1/2015 | Ikeda | G06F 3/0485 715/770 |
| 2015/0058369 A1 | 2/2015 | Kong et al. | |
| 2015/0084855 A1* | 3/2015 | Song | G06F 3/013 345/156 |
| 2015/0089356 A1* | 3/2015 | Baklanovs | G06F 40/166 715/255 |
| 2015/0095855 A1* | 4/2015 | Bai | G06F 3/017 715/863 |
| 2015/0207850 A1 | 7/2015 | Jitkoff et al. | |
| 2015/0254518 A1 | 9/2015 | Griffin et al. | |
| 2016/0036966 A1* | 2/2016 | Ka | G06F 3/04817 455/566 |
| 2016/0062599 A1* | 3/2016 | Ko | G06Q 50/01 715/738 |
| 2016/0140095 A1 | 5/2016 | Park et al. | |
| 2016/0154686 A1* | 6/2016 | Huang | G06F 3/0488 715/770 |
| 2016/0171106 A1* | 6/2016 | Song | G06F 16/951 707/709 |
| 2016/0210013 A1 | 7/2016 | Park et al. | |
| 2016/0216862 A1* | 7/2016 | Turner | G06F 3/04842 |
| 2016/0266769 A1* | 9/2016 | Oursbourn | G06F 9/451 |
| 2016/0328110 A1 | 11/2016 | Zhao et al. | |
| 2017/0160905 A1* | 6/2017 | Lei | G06F 3/0484 |
| 2017/0220680 A1 | 8/2017 | Shattuck | |
| 2017/0235445 A1 | 8/2017 | Kim et al. | |

FOREIGN PATENT DOCUMENTS

| | | |
|---|---|---|
| CN | 102591562 A | 7/2012 |
| CN | 102768614 A | 11/2012 |
| CN | 102855079 A | 1/2013 |
| CN | 103092507 A | 5/2013 |
| CN | 103324440 A | 9/2013 |
| CN | 103379212 A | 10/2013 |
| CN | 103685626 A | 3/2014 |
| CN | 104077273 A | 10/2014 |
| CN | 104111772 A | 10/2014 |
| KR | 10-2009-0029518 A | 3/2009 |

(56) References Cited

FOREIGN PATENT DOCUMENTS

| KR | 10-2009-0102886 A | 10/2009 |
|----|-------------------|---------|
| KR | 10-2010-0030387 A | 3/2010 |
| KR | 10-2012-0013810 A | 2/2012 |
| KR | 10-2012-0021673 A | 3/2012 |
| KR | 10-2012-0029608 A | 3/2012 |
| KR | 10-2012-0076014 A | 7/2012 |
| KR | 10-2013-0005057 A | 1/2013 |
| KR | 10-2013-0016655 A | 2/2013 |
| KR | 10-2013-0086409 A | 8/2013 |
| KR | 10-2013-0143160 A | 12/2013 |
| KR | 10-2014-0030391 A | 3/2014 |
| KR | 10-2014-0062886 A | 5/2014 |
| KR | 10-2014-0078031 A | 6/2014 |

OTHER PUBLICATIONS

Korean Office Action dated Feb. 16, 2021, issued in Korean Patent Application No. 10-2014-0116514.
Chinese Office Action dated Jul. 1, 2021, issued in Chinese Patent Application No. 201580047151.5.
XP055340871, Techsmith: Snagit 11 Snagit 11.4 Help; Retrieved from the internet: URL: hllps://assets.techsmith.com/Downloads/ua-tutorials-snagit-11/Snagit_11.pdf on Jan. 1, 2017; Jan. 14, 2014.
Chinese Office Action dated Jul. 2, 2020, issued in Chinese Patent Application No. 201580047151.5.
Chinese Office Action dated Oct. 28, 2021, issued in Chinese Patent Application No. 201580047151.5.
Korean Office Action dated Jul. 14, 2022, issued in Korean Patent Application No. 10-2022-0073958.
Chinese Office Action dated Nov. 16, 2022, issued in Chinese Patent Application No. 202210543522.0.
Chinese Office Action dated Jan. 13, 2023, issued in Chinese Patent Application No. 202210534944.1.
Chinese Office Action dated Jun. 10, 2023, issued in Chinese Application No. 202210543522.0.
Indian Office Action dated Mar. 30, 2023, issued in Indian Application No. 201717011664.
Chinese Office Action dated Jul. 14, 2023, issued in Chinese application No. 202210534944.1.

\* cited by examiner

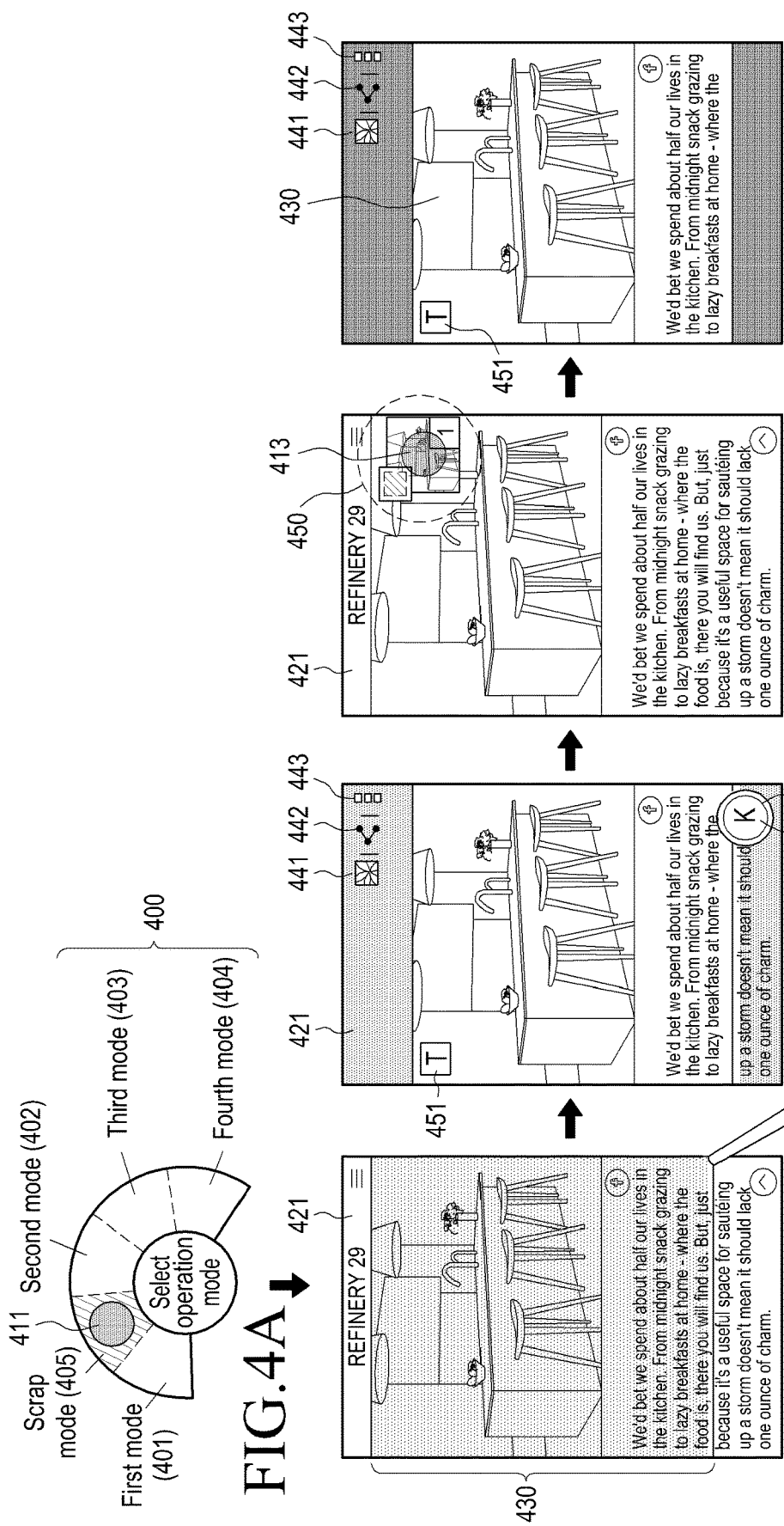

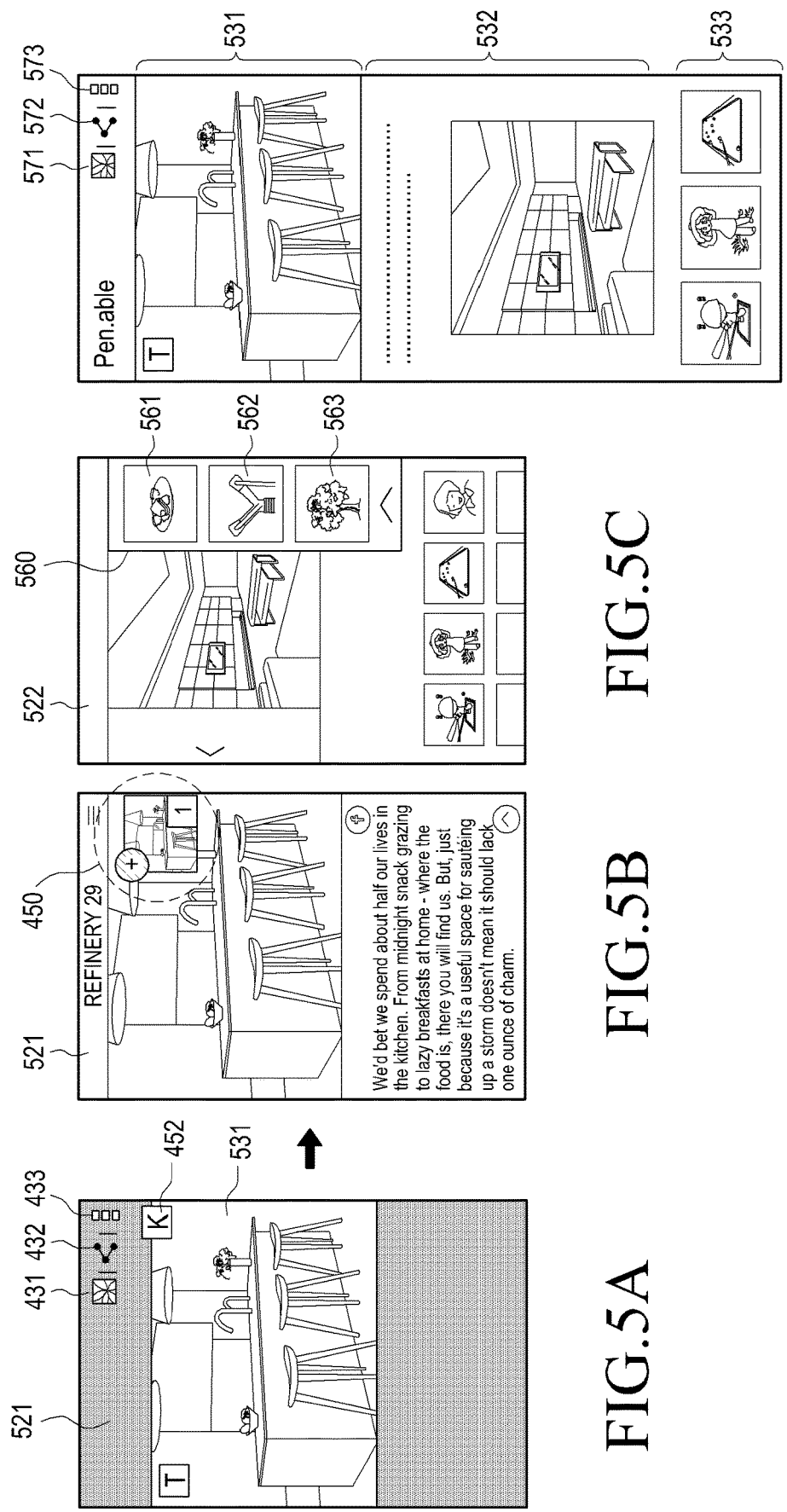

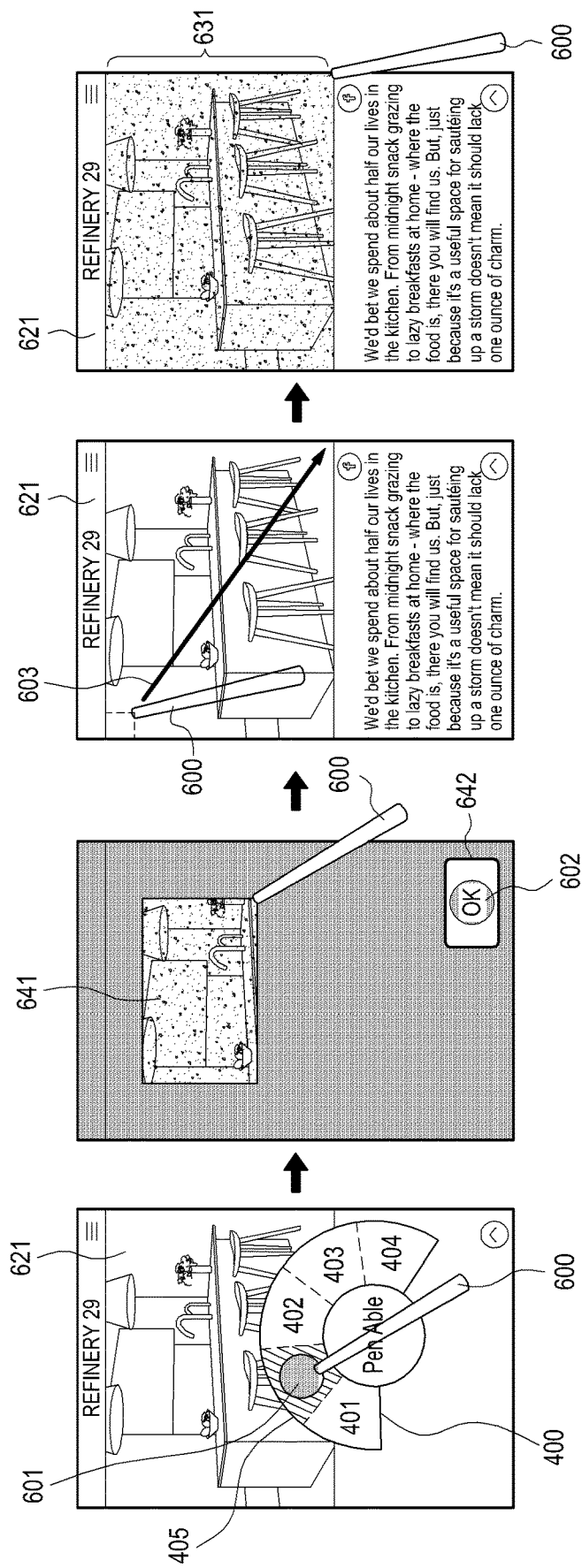

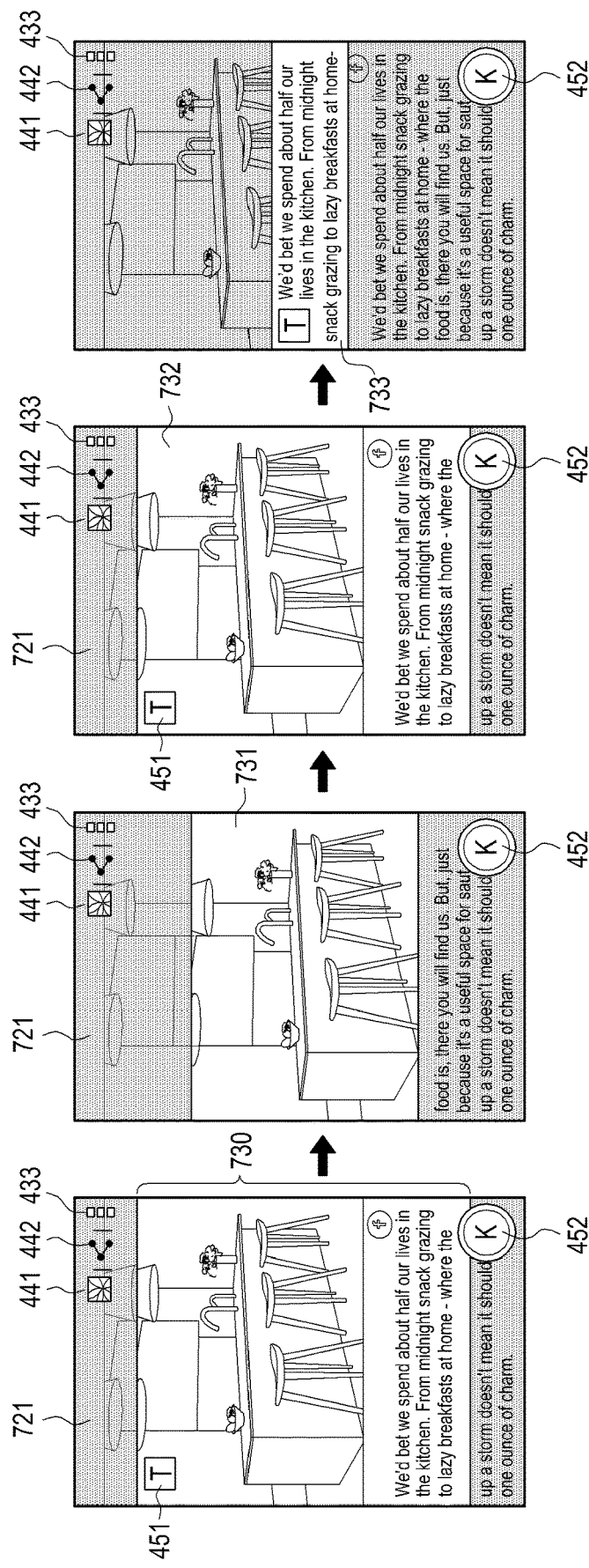

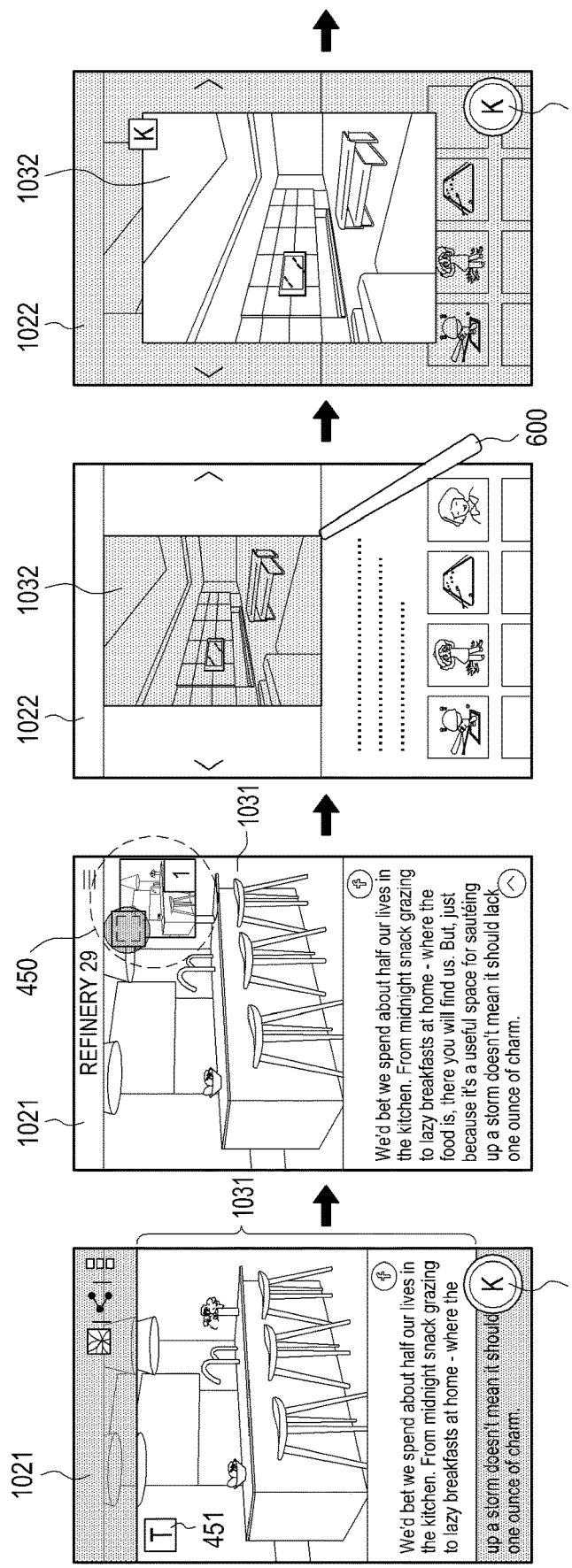

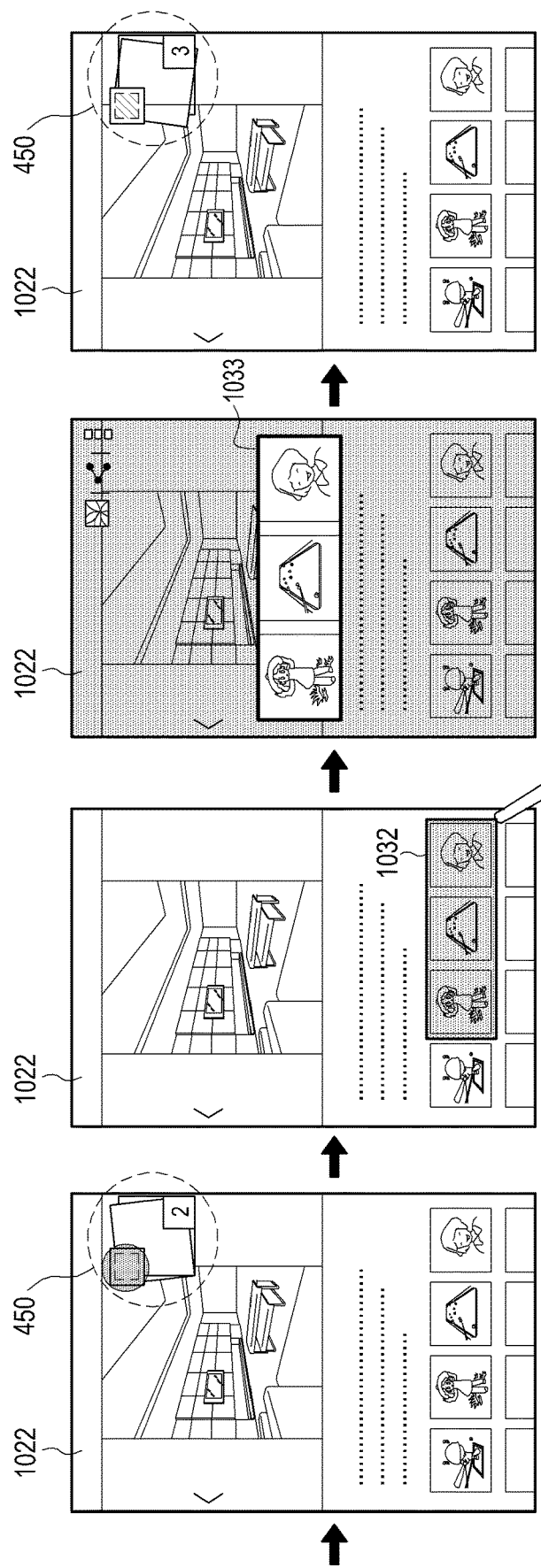

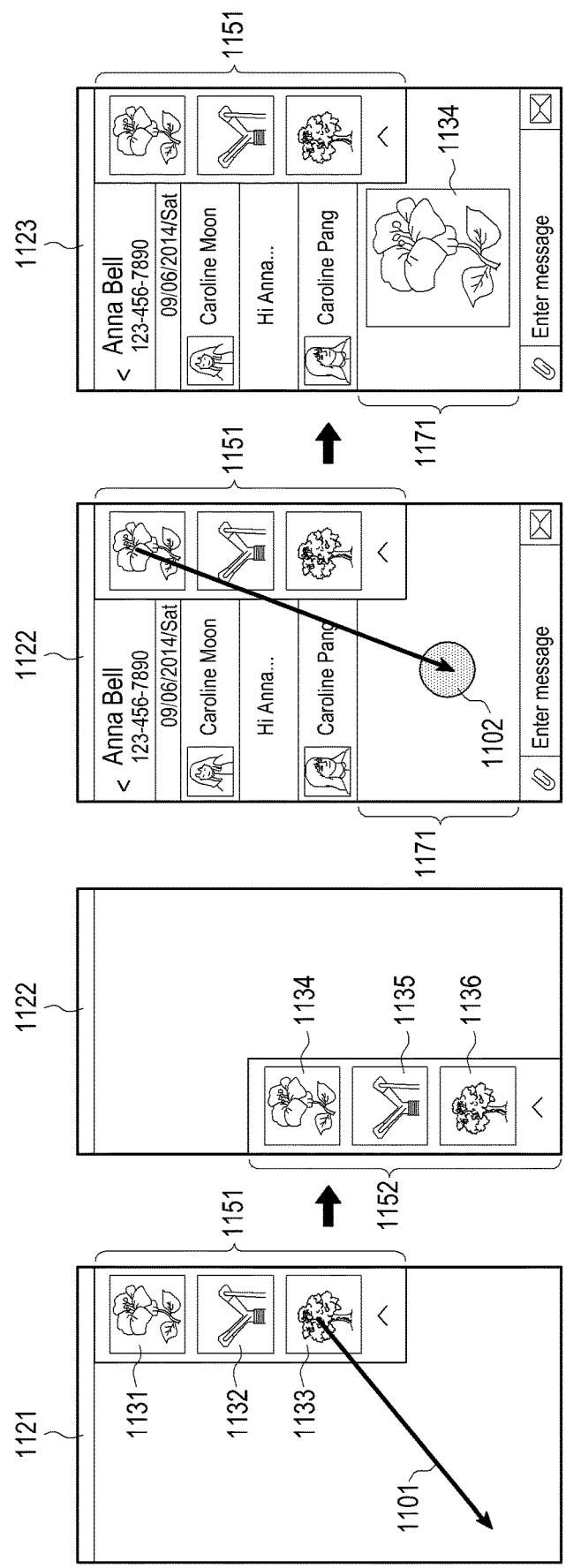

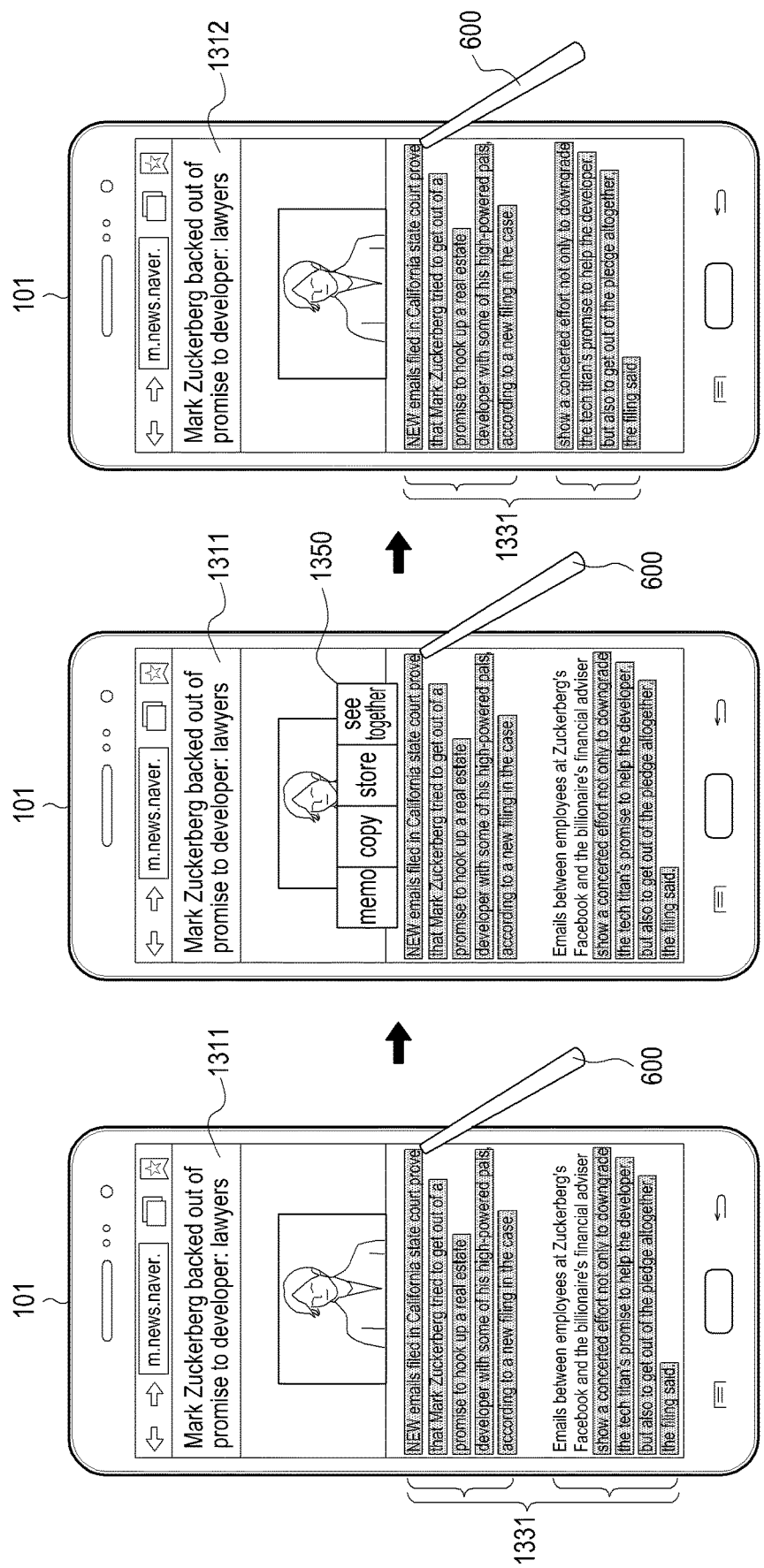

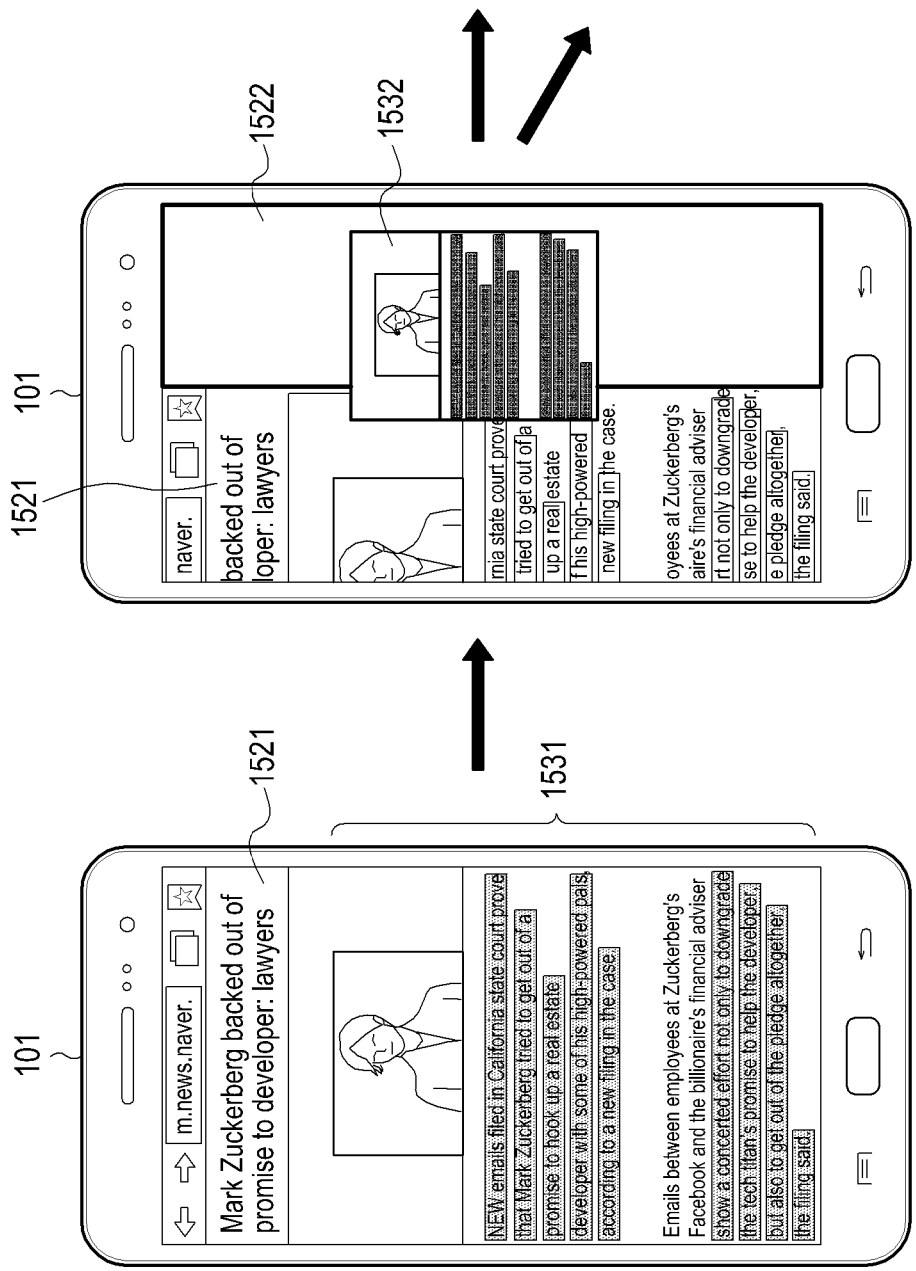

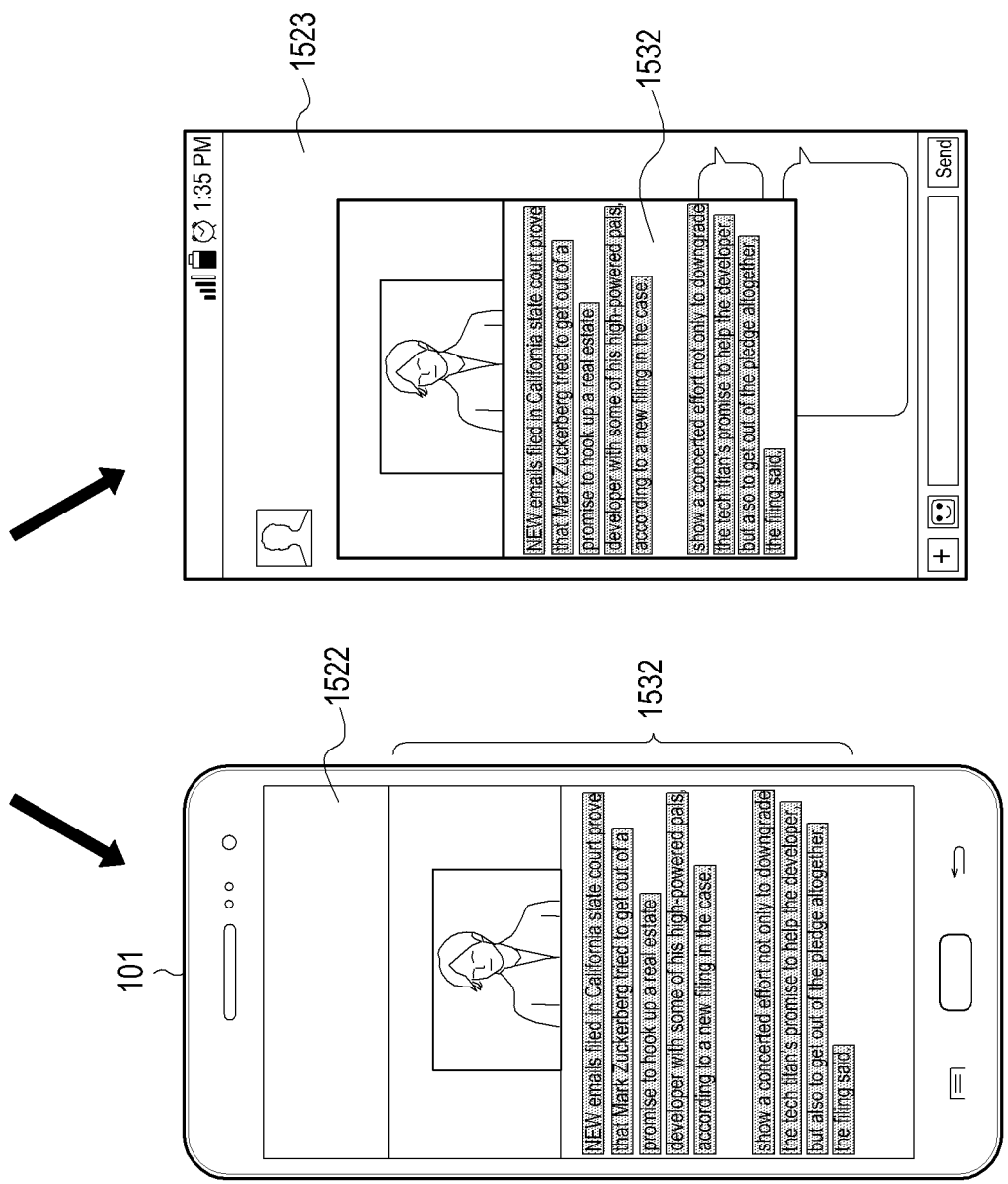

```
<div class="post-outer">
<div class="post hentry uncustomized-post-template" itemprop="blogPost" itemscope="itemscope" itemtype="http://schema.org/BlogPosting">
<meta content="http://2.bp.blogspot.com/-tpIKRf-mk8U/UyxOEt4weel/AAAAAAAAtOc/jhjT_cNp5ts/s1600/ %EA%B7%B8%EB%A6%BC1.png" itemprop="image_url"/>
<meta content="4078785910203800485" itemprop="blogId"/>
<meta content="7365283253847970013" itemprop="postId"/>
<a name="7365283253847970013"></a>
<h3 class="post-title entry-title" itemprop="name">
<a href="http://3chj.blogspot.kr/2014/03/hyundai-i40-accident-in-korea.html">Hyundai i40 accident in Korea</a>
</h3>
<div class="post-header">
<div class="post-header-line-1"></div>
</div>
<div class="post-body entry-content" id="post-body-7365283253847970013" itemprop="description articleBody">
Hyundai i40 rear accident in Korea.<br />
<br />
<div class="separator" style="clear: both; text-align: center;">
<object width="320" height="266" class="BLOGGER-youtube-video" classid="clsid:D27CDB6E-AE6D-11cf-96B8-444553540000" codebase="http://download.macromedia.com/pub/shockwave/cabs/flash/swflash.cab#version=6,0,40,0" data-thumbnail-src="https://i1.ytimg.com/vi/8TK8leusikE/0.jpg"><param name="movie" value="https://www.youtube.com/v/8TK8leusikE?version=3&f=user_uploads&c=google-webdrive-0&app=youtube_gdata" /><param name="bgcolor" value="#FFFFFF" /><embed width="320" height="266" src="https://www.youtube.com/v/8TK8leusikE?version=3&f=user_uploads&c=google-webdrive-0&app=youtube_gdata" type="application/x-shockwave-flash" allowfullscreen="true"></embed></object></div>
<br />
<br />
<div class="separator" style="clear: both; text-align: center;">
```

FIG.18A

```
<a href="'http://2.bp.blogspot.com/-tpIKRf-mk8U/UyxOEt4weel/AAAAAAAAtOc/jhjT_cNp5ts/s1600/ %EA%B7%B8%EB%A6 %BC1.png"
imageanchor="1" style="margin-left: 1em; margin-right: 1em;" border="0"
src="'http://2.bp.blogspot.com/-tpIKRf-mk8U/UyxOEt4weel/AAAAAAAAtOc/jhjT_cNp5ts/s1600/ %EA%B7%B8%EB%A6 %BC1.png" height="146"
width="320" /></a></div>
<br />
It seems fairly fine.<br />
<br />
<div class="separator" style="clear: both; text-align: center;">
<a href="'http://1.bp.blogspot.com/-RrQOYLtOGUc/UyxOM0LqeDl/AAAAAAAAAtOk/vhvip31h6zA/s1600/1357528396_1345686320_MG_2153.jpg"
imageanchor="1" style="margin-left: 1em; margin-right: 1em;" border="0"
src="'http://1.bp.blogspot.com/-RrQOYLtOGUc/UyxOM0LqeDl/AAAAAAAAAtOk/vhvip31h6zA/s1600/1357528396_1345686320_MG_2153.jpg"
height="320" width="240" /></a></div>
<div class="separator" style="clear: both; text-align: center;">
<br /></div>
<div class="separator" style="clear: both; text-align: center;">
<br /></div>
<br />
<div style="clear: both;"></div>
</div>
<div class="post-footer">
<div class="post-footer-line post-footer-line-1">
<span class="post-author vcard">
작성자:
<span class="fn' itemprop='author' itemscope' itemtype='http://schema.org/Person'>
<meta content='https://plus.google.com/116128678607595427881' itemprop='url'/>
<a class='g-profile' href='https://plus.google.com/116128678607595427881' rel='author' title='author profile'>
<span itemprop='name'>jinhong Jung</span>
</a>
</span>
```

FIG.18B

METHOD OF PROCESSING CONTENT AND ELECTRONIC DEVICE THEREOF

CROSS-REFERENCE TO RELATED APPLICATION(S)

This application is a continuation application of prior application Ser. No. 14/843,387, filed on Sep. 2, 2015, which application claims the benefit under 35 U.S.C. § 119(a) of a Korean patent application filed on Sep. 2, 2014 in the Korean Intellectual Property Office and assigned Serial number 10-2014-0116514, the entire disclosure of which is hereby incorporated by reference.

TECHNICAL FIELD

The present disclosure relates to an electronic device for processing content.

BACKGROUND

Based on development of information communication technologies and semiconductor technologies, the supply and use of various portable terminals has rapidly increased. Particularly, recent portable terminals include various functions such as a television (TV) viewing function (for example, mobile broadcasting such as digital multimedia broadcasting (DMB) or digital video broadcasting (DVB)), an audio playback function (for example, Moving Picture Experts Group phase 1 or phase 2 (MPEG-1 or MPEG-2) audio layer-3 (MP3)), a picture function, and a data communication function, and audio an communication function such as voice calling or message transmission/reception.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an electronic device for allowing the user to easily use the memo function or the scrap function.

A user executes many steps to perform a memo function or scrap function of the related art, and thus, the user cannot easily use the memo function or the scrap function.

In accordance with an aspect of the present disclosure, a method for processing a content at an electronic device is provided. The method includes generating a first content corresponding to a user input applied to content displayed via the electronic device, and displaying a floating user interface (UI), which displays first scrap information on the first content, on a screen of the electronic device.

In accordance with another aspect of the present disclosure, an electronic device for processing a content is provided. The electronic device includes a display and a processor configured to generate a first content corresponding to a user input applied to content displayed via the display, and control the display to display a floating UI, which displays first scrap information on the first content, on a screen.

In accordance with another aspect of the present disclosure, a machine-readable storage medium recording a program for executing a method of processing a content by an electronic device is provided. The method includes generating a first content corresponding to a user input content displayed via the electronic device, and displaying a floating UI, which displays first scrap information on the first content, on a screen of the electronic device.

The present disclosure can provide a method and an electronic device for allowing the user to easily use a memo function or a scrap function.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4A, 4B, 4C, 4D, and 4E illustrate an example of processing contents by the electronic device according to various embodiments of the present disclosure;

FIGS. 5A, 5B, 5C, and 5D illustrate an example of processing contents by the electronic device according to various embodiments of the present disclosure;

FIGS. 6A, 6B, 6C, and 6D illustrate an example of selecting contents according to a user input by the electronic device according to various embodiments of the present disclosure;

FIGS. 7A, 7B, 7C, and 7D illustrate another example of processing contents by the electronic device according to various embodiments of the present disclosure;

FIGS. 10A, 10B, 10C, 10D, 10E, 10F, 10G, and 10H illustrate another example of processing contents by the electronic device according to various embodiments of the present disclosure;

FIGS. 11A, 11B, 11C, and 11D illustrate another example of processing contents by the electronic device according to various embodiments of the present disclosure;

FIGS. 13A, 13B, and 13C illustrate another example of processing contents by the electronic device according to various embodiments of the present disclosure;

FIGS. 15A, 15B, 15C and 15D illustrate another example of processing contents by the electronic device according to various embodiments of the present disclosure;

FIGS. 18A and 18B illustrate another example of processing contents by the electronic device according to various embodiments of the present disclosure;

Throughout the drawings, like reference numerals will be understood to refer to like parts, components, and structures.

DETAILED DESCRIPTION

Figure 1:
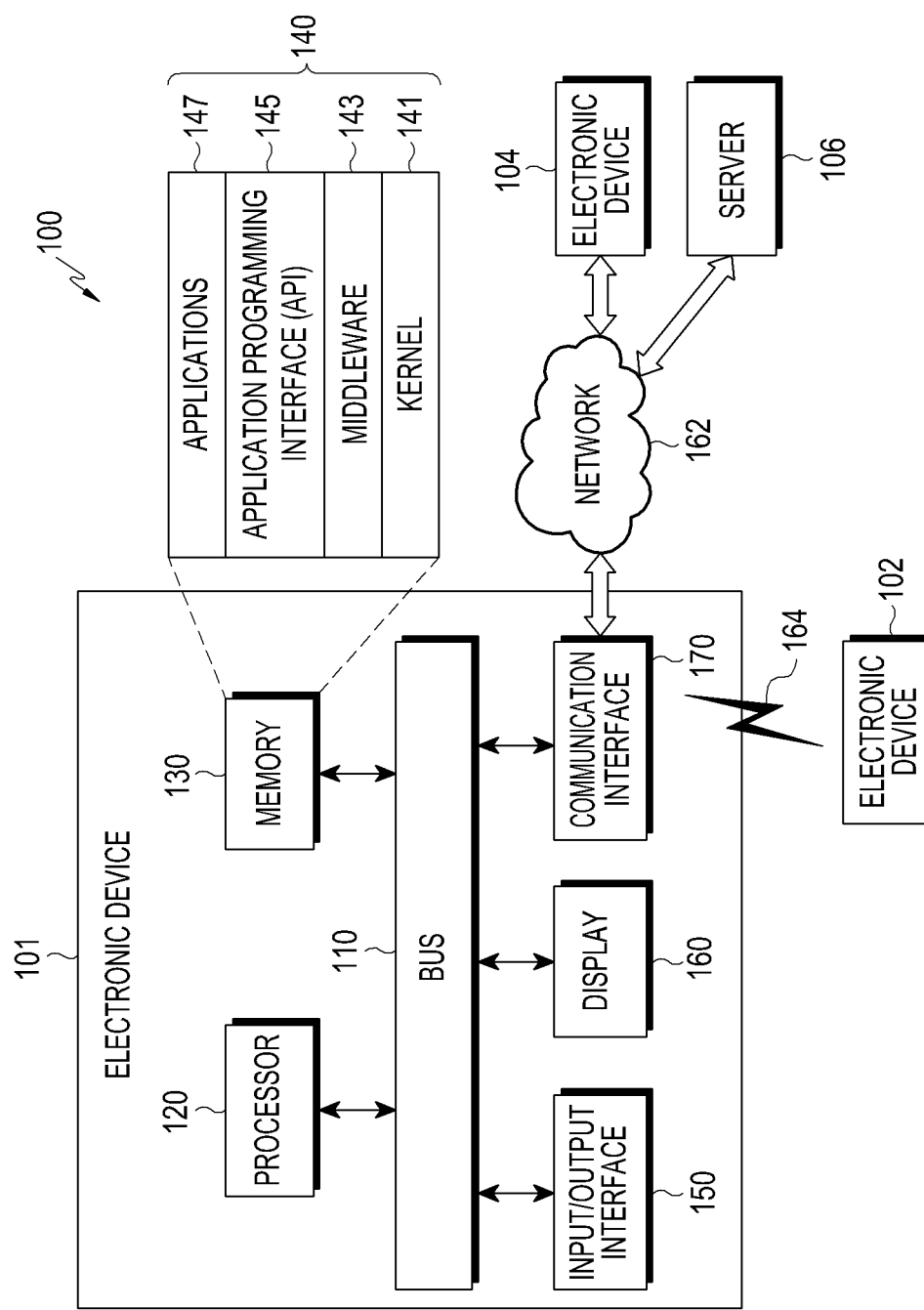
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

In the present disclosure, the expression "have", "may have", "include" or "may include" refers to existence of a corresponding feature (e.g., numerical value, function, operation, or components such as elements), and does not exclude existence of additional features.

Throughout the present disclosure the words "comprise" and "contain" and variations of the words, for example "comprising" and "comprises", means "including but not limited to", and is not intended to (and does not) exclude other moieties, additives, components, integers or steps.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. The expressions may be used to distinguish a component element from another component element. For example, a first user device and a second user device indicate different user devices although both of them are user devices. For example, a first element may be termed a second element, and similarly, a second element may be termed a first element without departing from the scope of the present disclosure.

When one element (e.g., a first element) is "(operatively or communicatively) coupled with/to or connected to" another element (e.g., a second element), it should be construed that the one element is directly connected to another element or the one element is indirectly connected to another element via yet another element (e.g., a third element). Conversely, when one component element is "directly coupled" or "directly connected" to another component element, it may be construed that a third component element does not exist between the first component element and the second component element.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

Features, integers, characteristics, compounds, chemical moieties or groups described in conjunction with a particular aspect, embodiment or example of the disclosure are to be understood to be applicable to any other aspect, embodiment or example described herein unless incompatible therewith.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to various embodiments, the electronic device may be a smart home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic devices for a ship (e.g., a navigation device for a ship, and a gyro-compass), avionics, security devices, an automotive head unit, a robot for home or industry, an automatic teller's machine (ATM), a point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to various embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to various embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. As used herein, the term "user" may indicate a person who uses an electronic device or a device (e.g., an artificial intelligence electronic device, an automated device for performing testing operations, etc.) that uses an electronic device.

FIG. 1 illustrates a network environment including an electronic device according to various embodiments of the present disclosure.

Referring to FIG. 1, a network environment 100 includes an electronic device 101. The electronic device 101 may include a bus 110, a processor 120, a memory 130, an input/output interface 150, a display 160, and a communication interface 170. According to various embodiments, the electronic device 101 may omit at least some of the above components or further include other components.

The bus 110 may include a circuit for connecting the components 120 to 170 and transmitting communication between the components (for example, control messages and/or data).

The processor 120 may include one or more of a CPU, an AP, and a communication processor (CP). For example, the processor 120 may carry out operations or data processing related to control and/or communication of at least one other component of the electronic device 101.

The processor 120 may control the electronic device 101 to perform a memo function or a scrap function. According to an embodiment, the electronic device 101 may execute a scrap mode for storing or temporarily storing data, for example, text or image selected by the user. Further, the processor 120 may control the electronic device 101 to inform the user that a stored or temporarily stored content exist by controlling the display 160 to display a floating user interface (UI).

The memory 130 may include a volatile memory and/or a non-volatile memory. The memory 130 may store, for example, commands or data related to one or more other components of the electronic device 101. According to an embodiment, the memory 130 may store software and/or a program 140. The program 140 may include, for examples, a kernel 141, middleware 143, an application programming interface (API) 145, and/or an at least one application program (or "applications") 147. At least some of the kernel 141, the middle 143, and the API 145 may be referred to as an operating system (OS).

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application program 147 may access individual components of the electronic device 101 to control or manage system resources.

The middleware 143 may serve as, for example, an intermediary such that the API 145 or the application program 147 communicate with the kernel 141 to transmit/receive data. Furthermore, in regard to task requests received from the application program 147, the middleware 143 may perform a control (for example, scheduling or load balancing) for the task requests using, for example, a method of assigning a priority for using the system resources (for example, the bus 110, the processor 120, or the memory 130) of the electronic device 101 to at least one application.

The API 145 is an interface by which the applications 147 control functions provided from the kernel 141 or the middleware 143, and may include, for example, at least one interface or function (for example, instructions) for file control, window control, image processing, or text control.

For example, the input/output interface 150 may serve as an interface that may transfer commands or data, which is input from the user or another external device, to the other components of the electronic device 101. Further, the input/output interface 150 may output commands or data of the electronic device 101 to the user or another external device.

The display 160 may include, for example, a liquid crystal display (LCD), a light emitting diode (LED) display, an organic light emitting diode (OLED) display, a micro electro mechanical system (MEMS) display, or an electronic paper display. The display 160 may display various contents (for example, text, images, videos, icons, or symbols). The display 160 may include a touch screen and receive, for example, a touch input, a gesture input, a proximity input, or a hovering input using an electronic pen or a user's body part.

The communication interface 170 may enable communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may include, for example, at least one of long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM) as a cellular communication protocol. The wired communication may include at least one of, for example, a universal serial bus (USB), a high definition multimedia interface (HDMI), recommended standard 232 (RS-232), and a plain old telephone service (POTS). The network 162 may include at least one of communication networks such as a computer network (for example, a local area network (LAN) or a wide area network (WAN)), the Internet, and a telephone network.

Each of the first and second external electronic devices 102 and 104 may be the same as or different from the electronic device 101. According to an embodiment, the server 106 may include a group of one or more servers.

According to various embodiments, all or some of the operations performed by the electronic device 101 may be performed by another electronic device or a plurality of electronic devices (for example, the electronic device 102 or 104 or the server 106). According to an embodiment, when the electronic device 101 should perform some functions or services automatically or by request, the electronic device 101 may request remotely perform at least some of the functions at another device (for example, the electronic device 102 or 104 or the server 106). The other electronic device (for example, the electronic device 102 or 104 or the server 106) may perform the additional function and transfer the result to the electronic device 101. The electronic device 101 may provide the requested functions or services based on the received result or after additionally processing the received result. To this end, for example, cloud computing, distributed computing, or client-server computing technology may be used.

Hereinafter, the user input received by the electronic device 101 may be one or more of the touch input, the hovering input, the voice input, and the gesture input. The touch input or the hovering input may be made by a user's body (for example, a finger or the like) or a stylus pen. The voice input may be received from the user through a microphone in the electronic device 101 and the gesture input may be received from the user through a camera in the electronic device.

In accordance with an aspect of the present disclosure, an electronic device for processing a content is provided.

Figure 2:
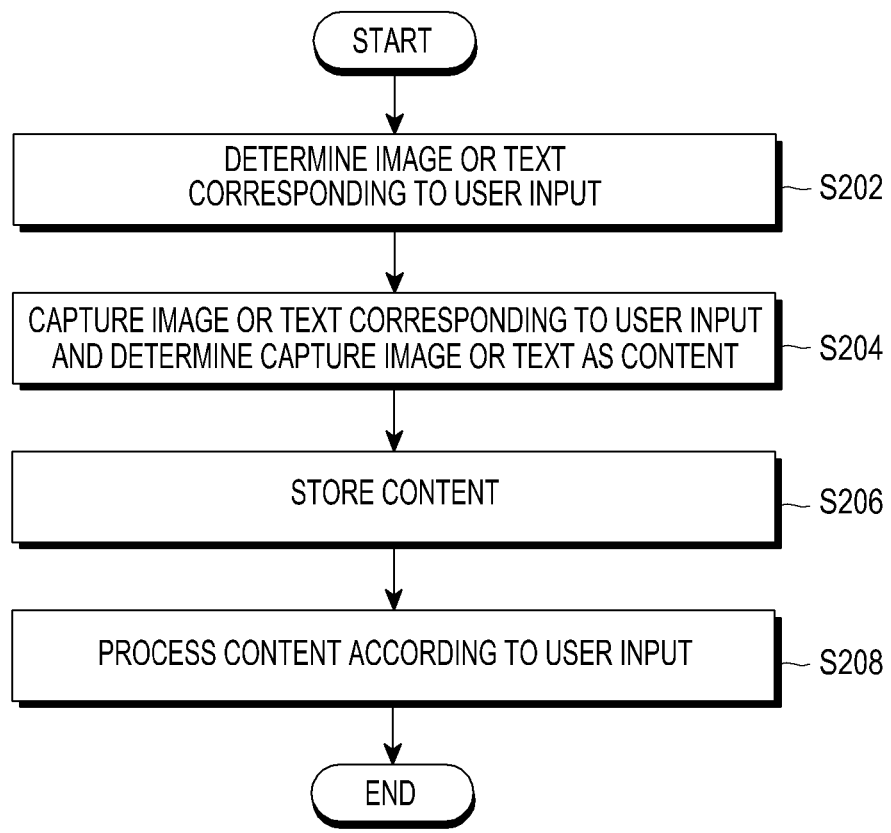
FIG. 2 is a flowchart of a method of processing contents by an electronic device according to various embodiments of the present disclosure.

FIG. 2 is a flowchart of a method of processing contents by an electronic device according to various embodiments of the present disclosure.

Referring to FIG. 2, the processor 120 may determine a text or image corresponding to a user input, for example, selecting of text or images through the display 160 in operation S202. When the text or image is selected according to the user input, the processor 120 may capture the text or image and determine the captured text or image as a content in operation S204. The content may be a captured image including both the text and an image selected by the user. For example, the user selects one area including 100 characters and 2 still images that are displayed on the screen in operation S202. The processor 120 may capture the 100 characters and the 2 still images and determine the captured area as the selected content in operation S204.

Thereafter, the processor 120 may store the content in operation S206. According to an embodiment, the processor 120 may temporarily store the content in the memory 130. Further, the processor 120 may process the content according to a user input in operation S208. According to an embodiment, the processor 120 may display the content on the display, or store, edit, share, or delete the content according to the user input in operation S208.

According to an embodiment, the processor 120 may store or temporarily store a plurality of contents, and process the plurality of stored or temporarily stored contents individually or simultaneously. Before operation S202, the electronic device 101 may store or temporarily store one or more contents. The processor 120 may store or temporarily store contents in an amount equal to a predetermined number. For example, the processor 120 may store or temporarily store 20 contents and process each of the 20 contents according to a user input.

Figure 3:
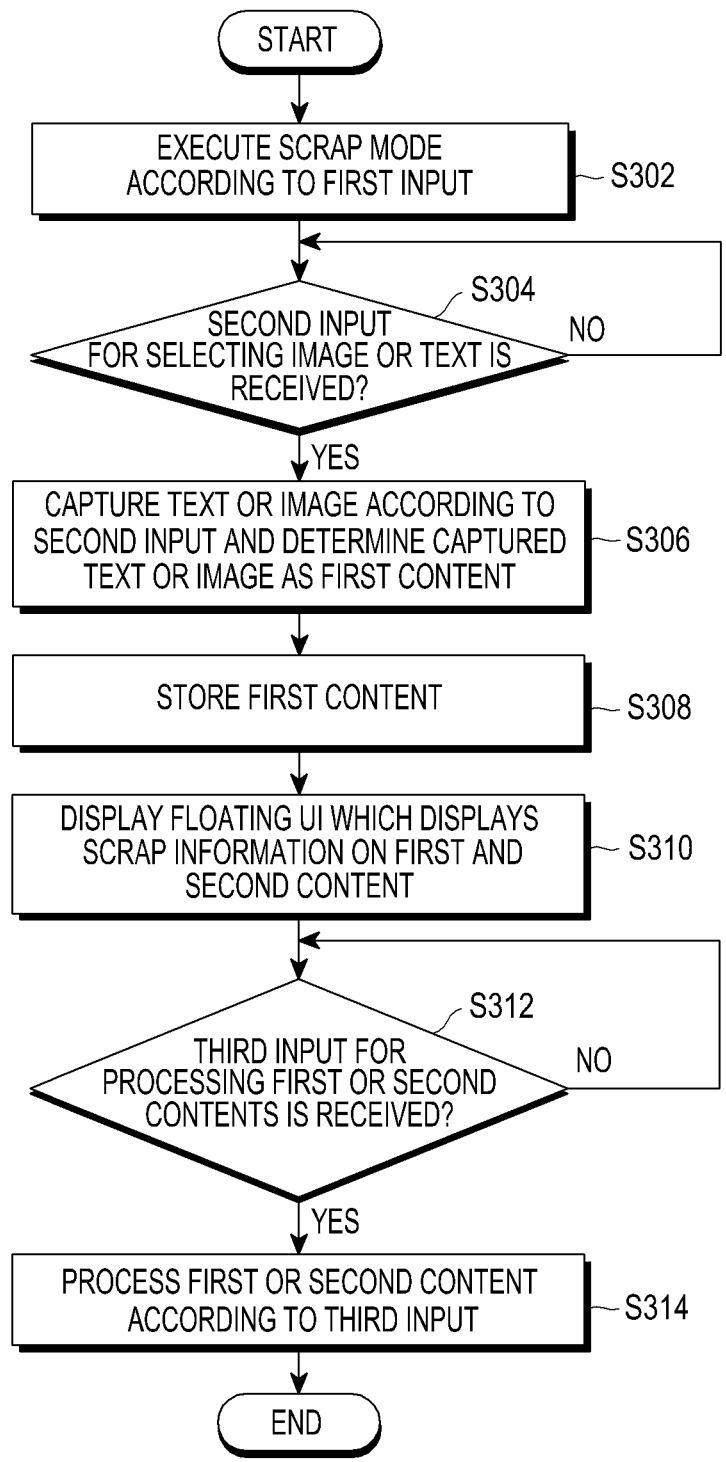
FIG. 3 is a flowchart of another method of processing the contents by the electronic device according to various embodiments of the present disclosure.

FIG. 3 is a flowchart of another method of processing contents by the electronic device according to various embodiments of the present disclosure.

Referring to FIG. 3, the electronic device 101 may execute a scrap mode according to a user input (first input) in operation S302. When the scrap mode is executed, the processor 120 of the electronic device 101 may determine whether a user input (second input) for selecting at least a part of the image (for example, still image or dynamic image) or text displayed on the screen is received in operation S304.

When the second input is not received in operation S304, the process returns back to operation S304 until a second input is received. In another embodiment, if the second input is not received in operation S304, the processor 120 may maintain the scrap mode without performing any operation. When the second input is received in operation S304, the processor 120 may capture the text or image according to the second input and determine the captured text or image as a first content in operation S306.

Subsequently, the processor 120 may store the first content in operation S308. The first content may remain within the electronic device 101 even though power of the electronic device 101 is turned off or the scrap mode is terminated. According to an embodiment, the first content may be stored in a temporary folder and, when power is turned on, the processor 120 may load the first content and display the loaded first content on the display 160.

According to another embodiment, the first content may be stored temporarily. When the first content is temporarily stored, the first content may be automatically deleted when power of the electronic device 101 is turned off or the scrap mode is terminated.

The electronic device 101 may display a floating UI including scrap information on the first content and a second content, which was stored before the first contents, on the screen in operation S310. The scrap information may include, for example, a thumbnail image of the first content and the second content and the number of first contents and the second contents. For example, the processor 120 may display thumbnail images corresponding to the first content and the second content in the floating UI as a radial menu. According to an embodiment, the processor 120 may display the floating UI on the uppermost layer (i.e., having the highest z-order).

When the first content or the second content is stored, content information, which corresponds to information on the corresponding content, may be stored in the memory 130. The content information may include the number of images included in each of the first content and the second content, a time when each of the first content and the second content is stored, and application information to which the image or text included in each of the first content and the second content is provided. When each of the first content and the second content is displayed on the display 160, the content information may be displayed together with the corresponding content.

Thereafter, the processor 120 may determine whether a user input (i.e., a third input) for processing the first or second content is received in operation S312. When the third input is not received in operation S312, the processor 120 may control the electronic device 101 to maintain the current state without performing any operation.

When the third input is received in operation S312, the processor 120 may process the first content or the second content according to the third input in operation S314. According to an embodiment, the processor 120 may display the first content or the second content on the screen, or store, edit, share, or delete the first content or the second content according to the user input in operation S314. For example, the processor 120 may convert colors of the image included in the first content or the second content into black and white, or extract the text included in the first content or the second content and store contacts such as a phone number and a mail address among the text in the memory 130.

Although the scrap mode is first executed and then the content corresponding to the user input is determined in FIG. 3, the operation mode may be automatically switched to the scrap mode when the image or text is selected according to the user input in another embodiment. The scrap mode may be automatically executed when a predetermined shortcut key is input to execute the scrap mode. Further, the scrap mode may be automatically executed when a predetermined gesture input or voice input is input to execute the scrap mode.

In accordance with an aspect of the present disclosure, a method for processing a content at an electronic device is provided. The method includes: generating a content corresponding to a user input among one or more contents displayed through a display of the electronic device as a first content; and displaying a floating UI, which displays first scrap information on the first content, on a screen.

FIGS. 4A, 4B, 4C, 4D and 4E illustrate an example of processing contents by the electronic device according to various embodiments of the present disclosure.

Referring to FIG. 4A, the electronic device 101 may execute first mode 401, second mode 402, third mode 403, fourth mode 404, and a scrap mode 405. According to an embodiment, the processor 120 may display a mode selection table 400 for selecting the operation mode corresponding to a user input on the display 160. The user may select the operation mode of the electronic device 101 by selecting one of the modes 401-405. In FIG. 4A, the electronic device 101 may receive a user input 411 for executing the scrap mode 405 from the user. At this time, the user input 411 may be, for example, tapping, clicking, or double-clicking the scrap mode 405.

According to an embodiment, the processor 120 may load the mode selection table 400 according to a user input. For example, the processor 120 may load the mode selection table according to a touch input for selecting a preset position of the screen continuously for a predetermined time or longer. Further, the electronic device 101 may directly enter the scrap mode without loading the mode selection table 400 according to a user input. For example, when an area including the image or text is selected, the scrap mode 405 is automatically executed, and then the area may be captured and stored as content. Further, the floating UI showing scrap information on the content may be displayed.

Referring to FIGS. 4B, 4C, 4D, and 4E, an execution screen 421 according to a user input 410 in the scrap mode 405 is illustrated.

Referring to FIG. 4B, the user selects a part 430 of the text or image included in the execution screen 421 using a finger or a stylus pen 600. The user may select the image or text within the area 430 by drawing a line from top to bottom of the area 430 including the text or image, which the user desires to select, in the execution screen 421 by using the stylus pen 600. Further, the processor 120 may generate a captured image by capturing the area 430.

According to an embodiment, the processor 120 may control the display 160 to distinguish the area 430, which is selected by the user, from other areas. In FIG. 4B, the display 160 may overlay the area 430 selected by the user with a layer of a color different from the background color of the execution screen 421.

Referring to FIG. 4C, the captured image 430 is floated over the execution screen 421. As illustrated in FIG. 4C, when the text or image is selected, the processor 120 may capture the area 430 including the text or image. Further, the processor 120 may float the captured image 430 to display it over the execution screen 421.

The user may input a command for processing the captured image 430 into the electronic device 101. According to an embodiment, the processor 120 may display an icon 452 corresponding to a command for temporarily storing the captured image 430 as content. In FIG. 4C, the user inputs a user input 412 for selecting the icon 452 into the electronic device 101. At this time, the user input 412 may be, for example, clicking or double-clicking the icon 452. When an icon 452 is selected, the processor 120 may temporarily store the captured image 430 as content. According to an embodiment, when the captured image 430 includes text, the processor 120 may display an icon 451 corresponding to a command for extracting and parsing the text on the captured image 430. Further, the electronic device 101 may process the captured image 430 according to a user input by selecting at least one of the icons 441, 442, and 443.

For example, the processor 120 may store the captured image 430 in the memory 130 or delete the captured image 430 according to a user input by selecting the icon 441. The processor 120 may combine captured images into one file according to the user input by selecting the icon 441. For example, if three contents are displayed on the display 160, the processor 120 may merge the three contents into a single file. For example, the processor 120 may merge the contents into one image or document file (for example, a pdf file).

Further, the captured image 430 may be shared with another application or other devices (for example, the electronic devices 102 and 104 or the server 106) according to a user input by selecting the icon 442. According to an embodiment, the processor 120 may determine an application or a device with which the captured image 430 is shared according to a user input. When the application or the device with which the captured image 430 is shared is determined, the processor 120 may convert a format of the captured image 430 into a format suitable for the corresponding application or device. For example, when the captured image 430 is shared with a first application, the processor 120 may convert the captured image 430 into a jpg file. Further, when the captured image 430 is shared with a second application, the processor 120 may convert the captured image 430 into a bmp file. In addition, the one captured image 430 may be simultaneously shared with a plurality of applications or devices. The processor 120 may convert the format of the captured image 430 into a format suitable for each of the applications and devices.

According to another embodiment, when the number of captured images 430 is two or more, the processor 120 may combine the captured images 430 into one file and share the file. For example, the processor 120 may combine three captured images 430 into one captured image and share the combined captured image. Further, the processor 120 may share each of the captured images 430 with each of the applications or devices. For example, when the number of captured images 430 is three, the processor 120 may sequentially transmit the three captured images 430 to the applications or the devices.

According to another embodiment, when the captured image 430 corresponds to an image generated by capturing only text, the processor 120 may extract characters from the captured image and share only the extracted characters with the applications or the devices. When the captured image 430 includes both the image and the text, the processor 120 may share the captured image 430 by transmitting each of the image and the text extracted from the captured image 430 to the applications or the devices. According to an embodiment, the applications or the devices, with which the captured image 430 is shared, may display both the image and the text or display only one of the image and the text according to the specification of the corresponding applications or devices.

Further, the processor 120 may edit information on the captured image 430 (for example, a tag including a photographing time of the image included in the captured image 430, a file size, a resolution, a file path, and like) according to a user input by selecting the icon 443.

Referring to FIG. 4D, when the captured image 430 is temporarily stored as a content, the electronic device 101 may display a floating UI 450 on the screen. The floating UI 450 may be a UI which informs the user that the captured image captured in FIG. 4D is temporarily stored in the electronic device 101. According to an embodiment, thumbnail images corresponding to one or more temporarily stored contents and the number of temporarily stored contents may be displayed through the floating UI 450. The floating UI 450 may have a form in which the thumbnail images overlap each other in a radial shape, a form in which the thumbnail images are horizontally arranged and overlap each other, or a form in which the thumbnail images are vertically arranged and overlap each other, and may have an animation in which the thumbnail images are rotated every preset time (for example, every one second). According to an embodiment, the processor 120 may display the floating UI 450 on the uppermost layer (i.e., with the highest z-order). Accordingly, the floating UI 450 may be displayed in the entire area of the screen of the display 160.

Referring to FIG. 4E, the processor 120 may display a thumbnail image of the content 430 through the floating UI 450 to inform that the content 430 is temporarily stored. Further, the content 430 is temporarily stored, the processor 120 may display "1" via the floating UI to indicate the number of temporarily stored contents.

Referring to FIG. 4D, the electronic device 101 receives a user input 413 for selecting the floating UI 450. When the electronic device 101 receives the user input 413, the processor 120 may control the display 160 to display the temporarily stored content 430 in the form of, for example, a popup window.

Referring to FIG. 4E, the temporarily stored content 430 in the form of the popup window is floated. Since the content 430 includes text, the processor 120 may display, on the content 430, an icon 451 corresponding to a command for extracting and parsing the text included in the contents 430. Further, when the content is loaded through the floating UI 450, the processor 120 may control the display 160 to not display the floating UI 450 or to display the floating UI 450 on a lower layer of the layer including the content 430, so as to make the floating UI 450 hidden by the content 430.

FIGS. 5A, 5B, 5C, and 5D illustrate another example of processing the contents by the electronic device according to various embodiments of the present disclosure.

Referring to FIG. 5A, an image selected according to a user input is captured and floated on an execution screen 521. When an image on the execution screen 521 is selected according to a user input, the image may be captured, and the icon 452 corresponding to the command for temporarily storing the captured image 531 as a content may be displayed on the image. According to an embodiment, since the captured image 531 does not include text in FIG. 5A, the icon 451 corresponding to the command for parsing the text may not be displayed on the captured image 531.

FIG. 5B illustrates an execution 521 after the capture image, that is, the content 531 is temporarily stored, and a scrap window 570 showing temporarily stored content 531 and 532 together. Referring to FIG. 5B, the floating UI 450 may be displayed on the execution screen 521. Although FIG. 5B illustrates the floating UI 450 on an upper right part of the execution screen 521, the floating UI 450 may be located at any part of the execution screen 521. The floating UI 540 may display the number of temporarily stored contents and a thumbnail image corresponding to each of the temporarily stored contents. In FIG. 5B, a thumbnail image reduced from the captured image, that is, the content 531 is displayed through the floating UI 450.

Referring to FIG. 5C, the processor 120 displays another execution screen 522 on the display 160 after the content 531 is temporarily stored. In FIG. 5C, it is assumed that the number of temporarily stored contents is plural. The processor 120 may display a floating window 560 including temporarily stored contents or thumbnail images 561, 562 and 563 corresponding to the contents on the execution screen 522. The floating window 560 may include the thumbnail images corresponding to the temporarily stored contents. For example, when there are 30 stored contents, the floating window 560 may also display all 30 thumbnail images. Although only the three thumbnail images 561, 562, and 563 are displayed in the floating window 560 in FIG. 5C, the processor 120 may display more thumbnail images through the floating window 560 according to a user input for scrolling the floating window 560.

Referring to FIG. 5D, the temporarily stored contents 531, 532, and 533 are displayed together. As illustrated in FIG. 5D, the scrap screen may display the temporarily stored contents 531, 532, and 533 sequentially in an order of temporary storage (i.e., either ascending or descending in time).

The scrap screen may include icons 571, 572, and 573 corresponding to commands for processing the temporarily stored contents 531-533. The processor 120 may process the contents 531-533 according to a user input for selecting one of the icons 571-573. For example, when the icon 571 is selected by the user, the processor 120 may switch the screen to an execution screen 531. When the icon 572 is selected by the user, the processor 120 may share the corresponding content with another application or other devices (for example, the electronic devices 102 and 104 or the server 106). When the icon 573 is selected by the user, the processor 120 may delete the corresponding content.

According to an embodiment, the processor 120 may select one of the contents 531, 532, and 533 and then process the corresponding content according to a user input for selecting one of the icons 571-573. According to another embodiment, the user may select one of the contents 531-533 and request processing the corresponding content to the electronic device 101 by dragging the selected content to one of the icons 571-573. According to another embodiment, the user may select one of the contents 531-533 and then make a request for deleting the content to the electronic device 101 by dragging the corresponding content to the left or right side.

FIGS. 6A, 6B, 6C, and 6D illustrate an example of selecting a content according to a user input by the electronic device 101 according to various embodiments of the present disclosure.

FIG. 6A illustrates an operation mode of the electronic device 101, and a scrap mode is selected according to a user input. Referring to FIG. 6A, the electronic device 101 may execute the first to fourth modes 401, 402, 403, and 404, and the scrap mode 405. According to an embodiment, the processor 120 may display the mode selection table 400 for selecting the operation mode corresponding to a user input on the display 160. The user may select the operation mode of the electronic device 101 by selecting one of the modes 401-405. The electronic device 101 may receive a user input 601 for executing the scrap mode 405 from the user. At this time, the user input 601 may be, for example, clicking or double-clicking the scrap mode 405. The user input 601 may be made by selecting the scrap mode 405 using a stylus pen 600 by the user.

Referring to FIG. 6B, an area 641 is illustrated in which a content to be temporarily stored is selected according to a user input. The user may select the area 641 including an image or text through the stylus pen 600 and capture the image or text included in the area 641. Further, the user may input a command for temporarily storing the captured image as a content into the electronic device 101.

Referring to FIG. 6B, the user selects the area 641 including the image or text by inputting, into the electronic device 101, a user input 602 for selecting a virtual OK button 602 displayed on the execution screen 621 through the display 160.

Referring to FIG. 6C, a user input 603 for selecting contents to be temporarily stored is illustrated.

Referring to FIG. 6C, the user draws a diagonal line 603 from the upper left part of the execution screen 621 by using the stylus pen 600. The processor 120 may determine a rectangle including the diagonal line as the area including the image or text which the user desires to temporarily store. Referring to FIG. 6D, a captured image 631 generated by the user input 603 in FIG. 6C is illustrated. In order to indicate that the image or text is selected according to the user input 603, the processor 120 may control the display 160 such that a layer with a color different from the background color of the execution screen 621 is located on the area 631 including the image or text.

FIGS. 7A, 7B, 7C, and 7D illustrate another example of processing the contents by the electronic device according to various embodiments of the present disclosure.

Referring to FIG. 7A, the electronic device 101 selects or temporarily stores text or an image among the images or text included in an execution screen 721 as content 730 according to a user input.

FIG. 7A illustrates icons 441, 442, 443, 451, and 452 corresponding to commands for processing the stored content 730. When an image or text is selected in the execution screen 721, the processor 120 may capture the selected image or content, and separately float the captured image 731 on an execution screen 721. The user may temporarily store the captured image 731 as a content by inputting a user input for selecting the icon 452.

Referring to FIG. 7B, content 732 only stores an image. Referring to FIG. 7C, content 732 stores an image and text. Referring to FIG. 7D, content 733 only includes text. As illustrated in FIGS. 7A to 7C, the electronic device 101 may temporarily store the contents 731, 732, and 733 according to a user input by selecting the icon 452. Further, in FIGS. 7B and 7C, the electronic device 101 may extract and parse text included in the contents 732 and 733 by selecting the icon 451.

Figures 8A, 8B:
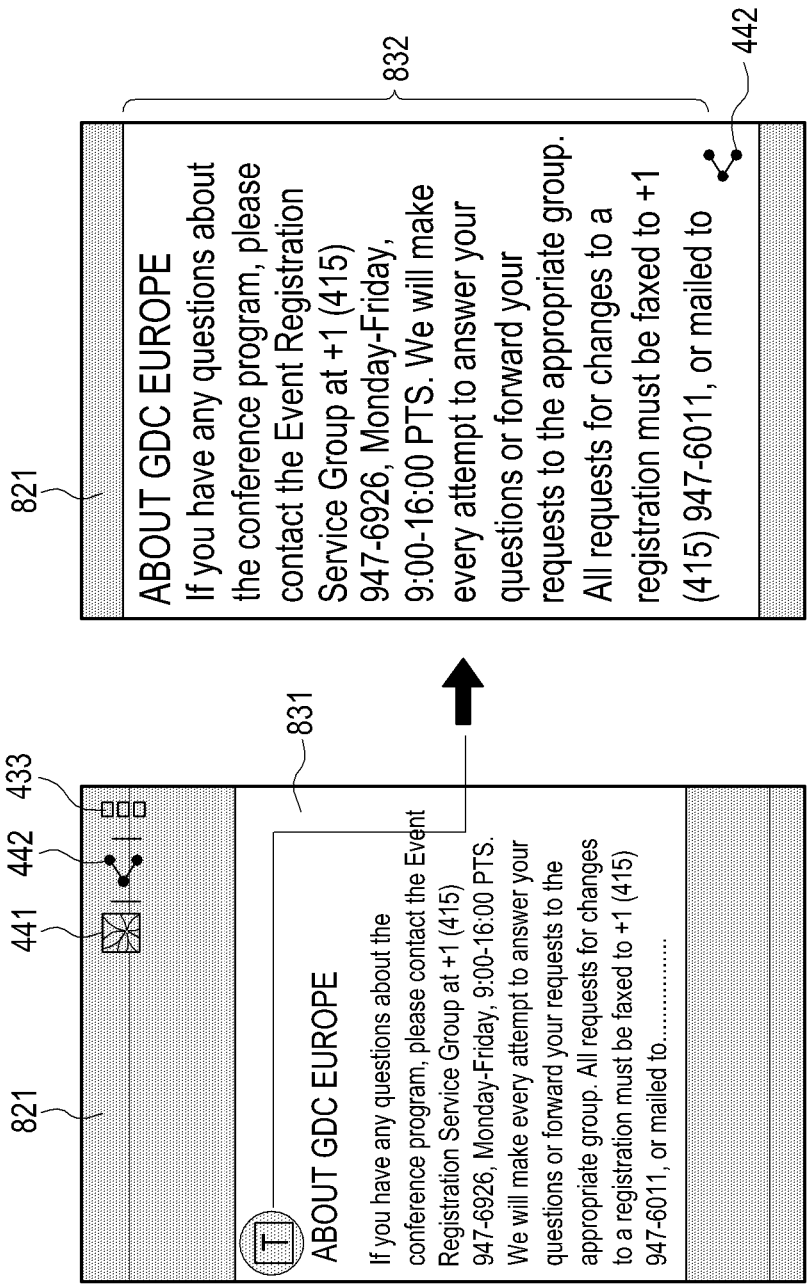
FIGS. 8A and 8B illustrate another example of processing contents by the electronic device according to various embodiments of the present disclosure.

FIGS. 8A and 8B illustrate another example of processing the contents by the electronic device according to various embodiments of the present disclosure.

Referring to FIG. 8A, a captured image 831 that is generated by capturing an area in an execution screen 821 is floated.

Since the content 831 illustrated in FIG. 8A is a still image, the text included in the content 831 is also included as a part of the still image. The processor 120 may extract text data from the content 831 through, for example, an OCR scheme. Referring to FIG. 8B, text data 832 is illustrated and was extracted from the content 831. In FIGS. 8A and 8B, the processor 120 may temporarily store the capture image 831 as a content.

According to an embodiment, the processor 120 may parse the text data 832. The processor 120 may parse all of characters, numbers, and special letters included in the text data 832. The processor 120 may share the text data 832 with all applications, that can be executed by the electronic device 101, or with other devices (for example, the electronic devices 102 and 104 or the server 106) according to the user input for selecting the icon 442. Further, the processor 120 may extract contacts such as an address, a phone number, a mail address, and a website address included in the text data 832 and may determine the extracted data as scrap information on the content 831. The processor 120 may temporarily store the scrap information to correspond to the content 831 and display the scrap information through the floating UI 450.

According to an embodiment, the processor 120 may display, on the execution screen 831, a predetermined image (for example, a loading image) indicating that the text data 832 is being extracted until the text data 832 can be displayed on the display 160 as illustrated in FIG. 8B.

Figure 9:
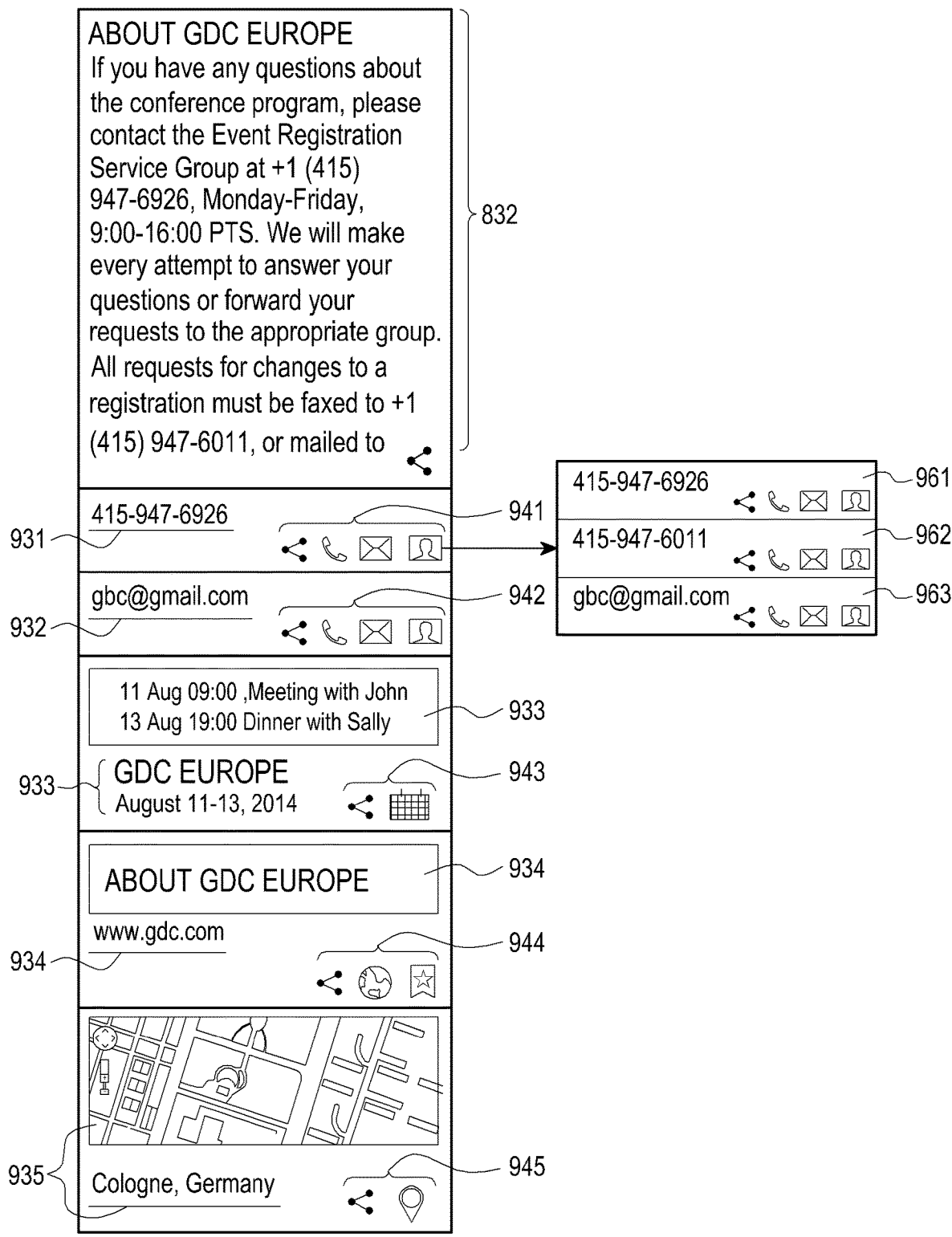
FIG. 9 illustrates another example of processing contents by the electronic device according to various embodiments of the present disclosure.

FIG. 9 illustrates another example of processing the content by the electronic device 101 according to various embodiments of the present disclosure.

Referring to FIG. 9, an example is illustrated in which the processor 120 may extract information the text data 832 as results 931-935. According to an embodiment, the processor 120 may separately extract only an image from the content 831. Further, the processor 120 may control the display 160 to display a result of analysis of the text data 832 close to the text data 832. In FIG. 9, results 931 to 935 of the analysis of the text data 832 are displayed on the lower part of the text data 832.

The processor 120 may extract a phone number 931 from the text data 832. Further, the processor 120 may also display icons 941 corresponding to a command for processing the phone number 931. The processor 120 may share the phone number 931 with another application or an electronic device (for example, the electronic device 102 or 104, or the server 106) according to a user input applied to one of the icons 941. For example, the processor 120 may call, send a mail, send a text message to the phone number 931, or add the phone number 931 to an address book by selecting one of the icons 941. According to an embodiment, when there are multiple phone numbers included in the text data 932, the processor 120 may sequentially display phone numbers 961 and 962 and display a mail address 963 together with the phone numbers 961 and 962.

The processor 120 may extract an email address 932 from the text data 832. Further, the processor 120 may also display icons 942 corresponding to a command for processing the email address 932. The processor 120 may share the mail address 932 with another application or an electronic device (for example, the electronic device 102 or 104, or the server 106) by selecting one of the icons 942. Further, the processor 120 may share the email address 932, transmit an email to the email address 932, transmit a message to the email address 932, or add the email address 932 to the address book by selecting one of the icons 942.

The processor 120 may extract schedule information 933 from the text data 832. When the schedule is extracted, the processor 120 may manage the user's schedule by adding the schedule 933 information to a calendar app. Further, the processor 120 may also display icons 943 corresponding to a command for processing the schedule information 933. The processor 120 may share the schedule information 933 with another application or an electronic device (for example, the electronic device 102 or 104, or the server 106) by selecting one of the icons 943. Further, the processor 120 may share the schedule information 933 or add the schedule information 933 to the calendar app preinstalled in the electronic device 101 by selecting one of the icons 943.

The processor 120 may extract a website address from the text data 832 and display the website 934 below the text data 832. Further, the processor 120 may also display icons 944 corresponding to a command for processing the website address. The processor 120 may share the website 934 with another application or an electronic device (for example, the electronic device 102 or 104, or the server 106) by selecting one of the icons 944. Further, the processor 120 may browse the website 934 through a browser or add the website 934 to a bookmark list by selecting one of the icons 944.

The processor 120 may extract map data 935 (for example, an address or a GPS coordinate) from the text data 832. The processor 120 may display the map 935 including a position corresponding to the map data below the text data 832. Further, the processor 120 may also display icons 945 corresponding to a command for processing the map data 935 together with the map data 935. The processor 120 may share the map data 935 with another application or an electronic device (for example, the electronic device 102 or 104, or the server 106) by selecting one of the icons 945. Further, the processor 120 may display an address included in the text data on the map 935 by selecting one of the icons 945.

FIGS. 10A, 10B, 10C, 10D, 10E, 10F, 10G, and 10H illustrate another example of processing the contents by the electronic device according to various embodiments of the present disclosure.

Referring to FIG. 10A, the processor 120 may capture an area including an image and text from an execution screen 1021 and temporarily store the captured image 1031 as first a content. FIG. 10A floats and displays the temporarily stored first content 1031. When the first content 1031 is temporarily stored, a thumbnail image corresponding to the first content 1031 may be displayed in the floating UI 450.

Referring to FIG. 10B, when it is assumed that the temporarily stored content corresponds to the first content 1031, a floating UI 450 may display "1" as the number of temporarily stored contents.

Subsequently, the processor 120 may capture an area including one image from an execution screen 1022 and temporarily store the captured image 1032 as a second content. Referring to FIG. 10C, a user input for selecting the area including the image from the execution screen 1022 is illustrated. The user may select the area 1032 through the stylus pen 600 and capture the image or text included in the area 1032.

Referring to FIG. 10D, the captured image 1032 is floated on the execution screen 1022. The processor 120 may temporarily store the captured image 1032. Further, the processor 120 may convert the captured image 1032 into the second content and temporarily store the second content.

Referring to FIG. 10E, the processor 120 may display, on the execution screen 1022, the floating UI 450 to which a thumbnail image corresponding to the second content 1032 is added. Since the number of temporarily stored contents is 2, the floating UI 450 may display "2" as the number of temporarily stored contents.

Subsequently, the processor 120 may capture an area including three images from the execution screen 1022 and temporarily store the captured images 1033 as a third content. Referring to FIG. 10F, a user input for selecting the area is illustrated and includes the three images from the execution screen 1022. The user may select the area 1033 through the stylus pen 600 to determine the area including the image or text to be temporarily stored. Referring to FIG. 10G, the temporarily stored third content 1033 is floated on the execution screen 1022. The processor 120 may convert the captured image 1033 into the second content 1033 and temporarily store the second contents.

The processor 120 may display, on the execution screen 1022, the floating UI 450 to which a thumbnail image corresponding to the third content 1033 is added. Since the number of temporarily stored contents is 3, the floating UI 450 may display "3" as the number of temporarily stored contents. Referring to FIG. 10H, thumbnail images displayed through the floating UI 450 may be displayed to partially overlap each other. At this time, with respect to the thumbnail images corresponding to the temporarily stored contents, the floating UI 450 may first display the thumbnail image corresponding to the contents stored later. In contrast, with respect to the thumbnail images corresponding to the temporarily stored contents, the floating UI 450 may first display the thumbnail image corresponding to the contents stored relatively earlier.

FIGS. 11A, 11B, 11C, and 11D illustrate another example of processing the contents by the electronic device 101 according to various embodiments of the present disclosure.

Referring to FIG. 11A, a popup window 1151 including thumbnail images 1131, 1132, and 1133 corresponding to temporarily stored contents is displayed on an execution screen 1121. The popup window 1151 is an example of the floating UI 450, and may be displayed on execution screens 1121, 1122, and 1123 including thumbnail images 1131, 1132, and 1133 of temporarily stored contents. The popup window 1151 may be displayed at any position of the execution screen 1121 and may be move according to a user input. In FIG. 11A, the popup window 1151 is displayed on an upper right part of the execution screen 1121. Referring to FIG. 11B, a popup window 1152 including thumbnail images 1134, 1135, and 1136 corresponding to the temporarily stored contents is displayed on a lower left part of the execution screen 1122.

Referring to FIG. 11A, a user input 1101 is input for selecting one thumbnail image 1133 by dragging the selected thumbnail image 1133 in a diagonal direction. The processor 120 may move the contents corresponding to the thumbnail image 1131-1133 according to the user input 1101. Referring to FIG. 11B, the popup window 1151 moves based on the user input 1101 and is positioned on a lower left part of the execution screen 1122. Referring to FIG. 11B, the popup window 1152 moved according to the user input 1101 is displayed on a lower left part of the execution screen 1122. FIGS. 11C and 11D illustrate an example for moving temporarily stored contents 1134 to 1136 to the execution screen 1123 by using a popup window 1151.

Referring to FIG. 11C, the processor 120 displays a text message window according to a message transmission/reception application as the execution screen 1123. The electronic device 101 receives a user input 1102 for selecting the thumbnail image 1134 and dragging the selected thumbnail image 1134 in a diagonal direction. According to an embodiment, the electronic device 101 may move the thumbnail image 1134 to an input window 1171 of the execution screen 1123.

The processor 120 may move the contents 1134 corresponding to the thumbnail image 1134 to the execution screen 1123 according to the user input 1102 as illustrated in FIG. 11C. That is, the processor 120 may allow the user to use the contents 1134 in an application by moving the contents 1134 according to the user input 1102. Referring to FIG. 11D, the user may transmit the contents 1134 to another device through the message transmission/reception application.

Figures 12A, 12B:
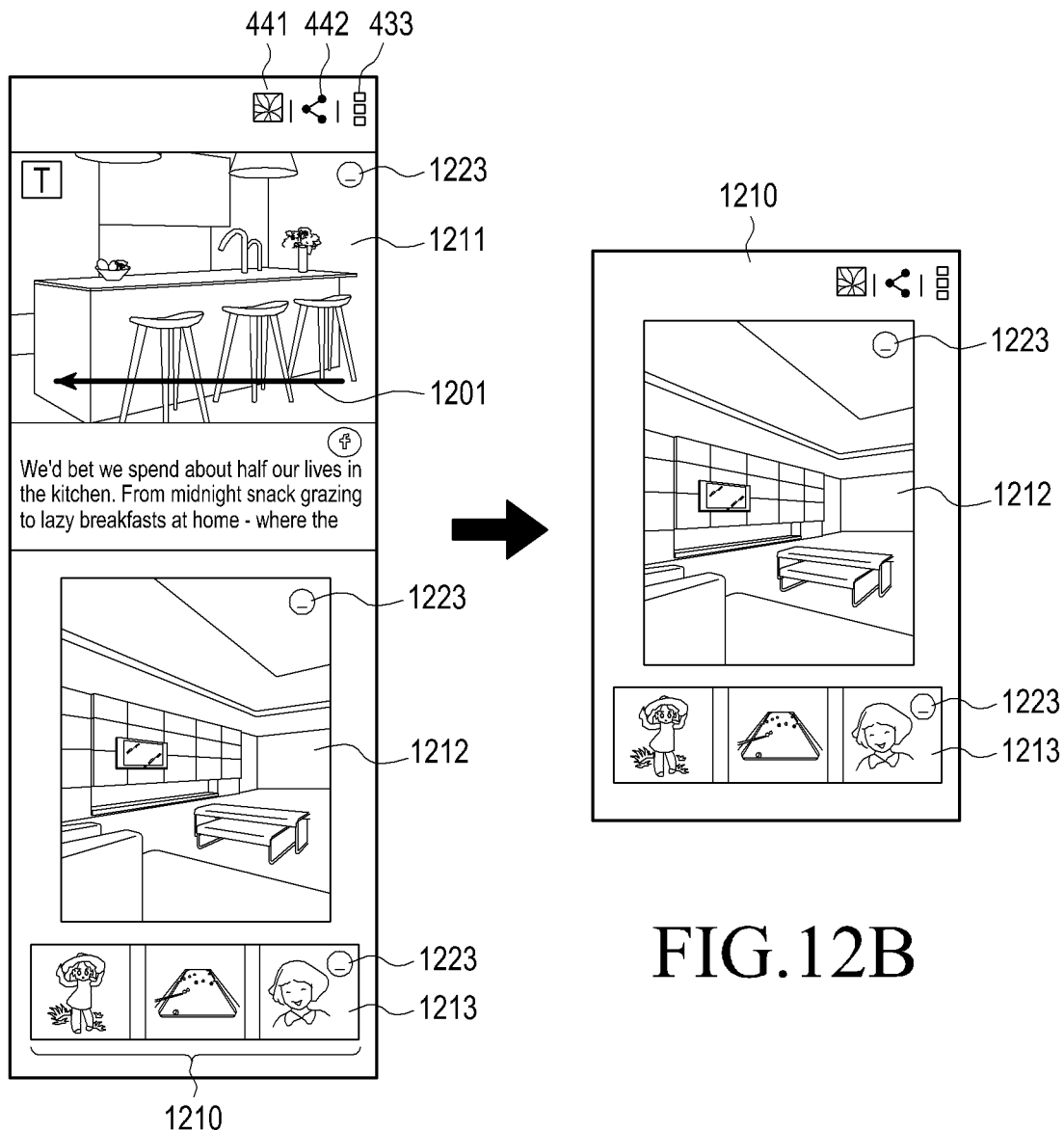
FIGS. 12A and 12B illustrate another example of processing contents by the electronic device according to various embodiments of the present disclosure.

FIGS. 12A and 12B illustrate another example of processing the contents by the electronic device according to various embodiments of the present disclosure. In FIGS. 12A and 12B, screens displaying a list 1210 of temporarily stored contents are illustrated.

Referring to FIG. 12A, the processor 120 may generate a list 1210 in which temporarily stored contents 1211, 1212, and 1213 are arranged based on when the contents 1211-1213 are stored. The processor 120 may execute a command corresponding to each of the icons 441, 442, and 443. For example, the processor 120 may store, delete, share and edit at least one of the contents 1211-1213 according to the user input. Referring to FIG. 12A, a user input 1201 for deleting the first contents 1211 is input. The processor 120 may remove the selected first content 1211 from the list 1210. Referring to FIG. 12B, the list 1210 having the first content 1211 is removed is illustrated.

According to another embodiment, the processor 120 may delete the corresponding content from the list 1210 by receiving a user input for selecting the icon 1223 displayed on each of the contents 1211-1213.

FIGS. 13A, 13B, and 13C illustrate another example of processing the contents by the electronic device according to various embodiments of the present disclosure.

Referring to FIG. 13A, the processor 120 may receive a user input for selecting text displayed on an execution screen 1311 through the stylus pen 600. The processor 120 may control the display 160 such that the selected text 1331 is underlined. An area including the selected text or image may be captured and temporarily stored as a content. As illustrated in FIG. 13A, the user may select a desired image or text by inputting a user input for underlining the desired image or text into the electronic device 101.

Referring to FIG. 13B, when the text or image is selected, the processor 120 may display an editing menu 1350. The user may determine a method of processing the selected image or text by selecting one of the menus included in the editing menu 1350. In FIG. 13B, the user selects the "see together" menu. Referring to FIG. 13C, in response to the selected menu item, an operation according to the selected menu in FIG. 13B is executed. The execution screen displays only the image or the text selected by the user in FIG. 13A.

Figures 14A, 14B:
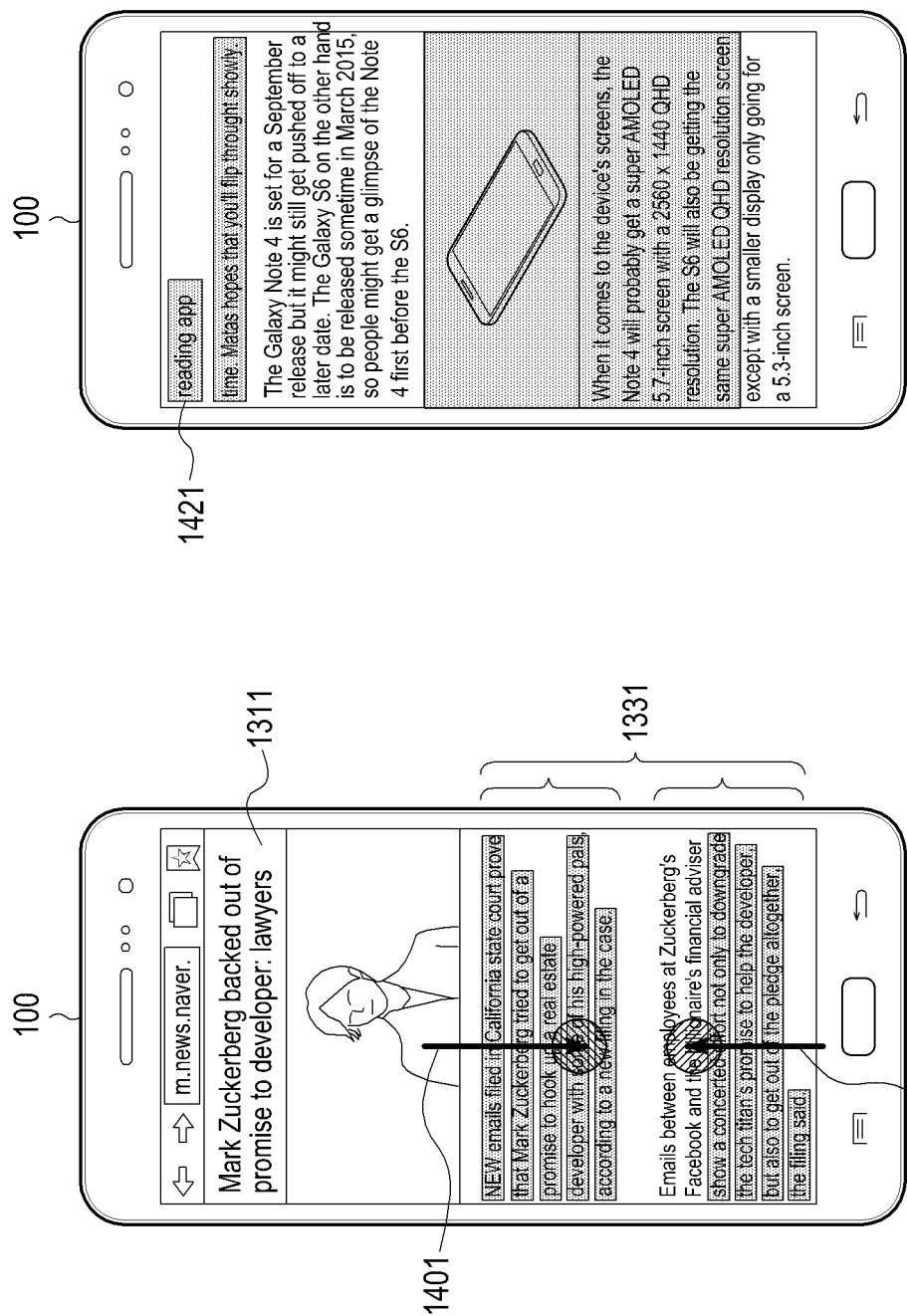
FIGS. 14A and 14B illustrate another example of processing contents by the electronic device according to various embodiments of the present disclosure.

FIGS. 14A and 14B illustrate another example of processing the contents by the electronic device according to various embodiments of the present disclosure.

Referring to FIG. 14A, a user input 1401 for the "see together" function is provided. The processor 120 may control the display 160 to display only the image or the text selected by the user according to the user input 1401.

Referring to FIG. 14B, when the image or the text is selected according to the user input, the processor 120 may control the display 160 to distinguish between texts included in different paragraphs. In FIG. 14B, a text included in a first paragraph and a text included in a second paragraph are selected according to a user input.

FIGS. 15A, 15B, 15C, and 15D illustrate another example of processing the contents by the electronic device according to various embodiments of the present disclosure.

Referring to FIG. 15A, an execution screen 1521 illustrates execution of a first application.

Referring to FIG. 15A, the processor 120 may capture an area 1531 including an image or a text corresponding to a user input and temporarily store the captured image as content 1532.

The processor 120 may move the content 1532 to an execution screen that executes an application different from the first application according to a user input.

Referring to FIG. 15B, the content 1532 is moved to an execution screen 1522 that executes a second application. Since the content 1532 includes both the image and the text, the second application may receive both the image and the text included in the content 1532. According to another embodiment, scrap information on the content 1532 may be input into the second application. The user may move the content 1532 to the second application by dragging the selected image or text to the execution screen 1522.

Referring to FIG. 15C, the content 1532 is displayed on the execution screen 1522 that executes the second application. According to an embodiment, the processor 120 may copy the content 1532 to the second application.

Referring to FIG. 15D, the content 1532 is moved or copied to an application other than the first application. In FIG. 15D, a third application is a messenger. The user may display the content 1532 in a messenger window 1523 by dragging the content 1532 to the messenger window 1523.

Figure 16:
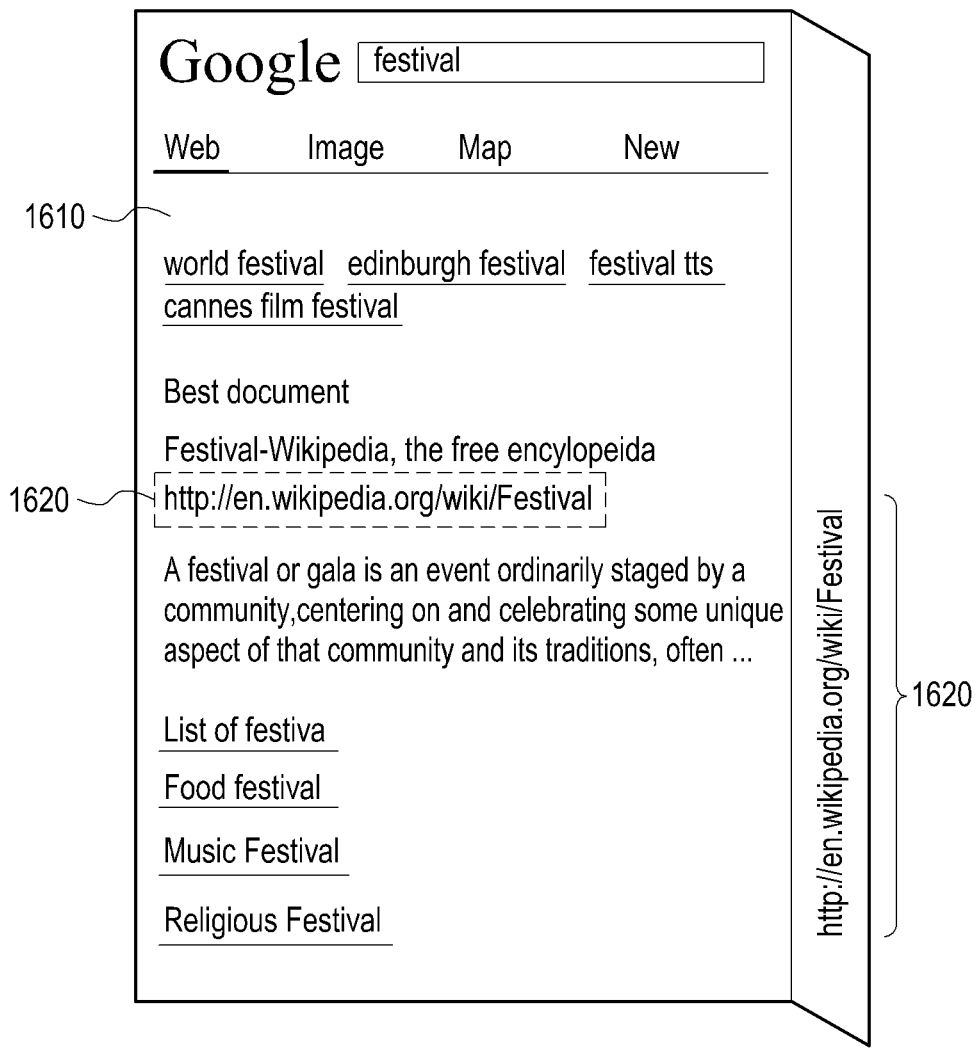
FIG. 16 illustrates another example of processing contents by the electronic device according to various embodiments of the present disclosure.

FIG. 16 illustrates another example of processing the contents by the electronic device according to various embodiments of the present disclosure.

Referring to FIG. 16, the processor 120 may extract a website address 1620 displayed in the browser window 1610 according to a user input. For example, the user input may be a flick on the browser window 1610 by using a finger or the stylus pen 600, and another type of input (for example, a hovering input, a voice input, a gesture input, or the like)

may be recognized by the electronic device 101 as the user input for extracting the website address 1620.

When the website address 1620 is extracted, the processor 120 may temporarily store the website address 1620 and display the website address 1620 on the right side of the browser window 1610 as illustrated in FIG. 16. According to another embodiment, the user may delete the website address 1620 by a drag input by a directional input on the website address 1620 from top to bottom or from bottom to top.

Figure 17:
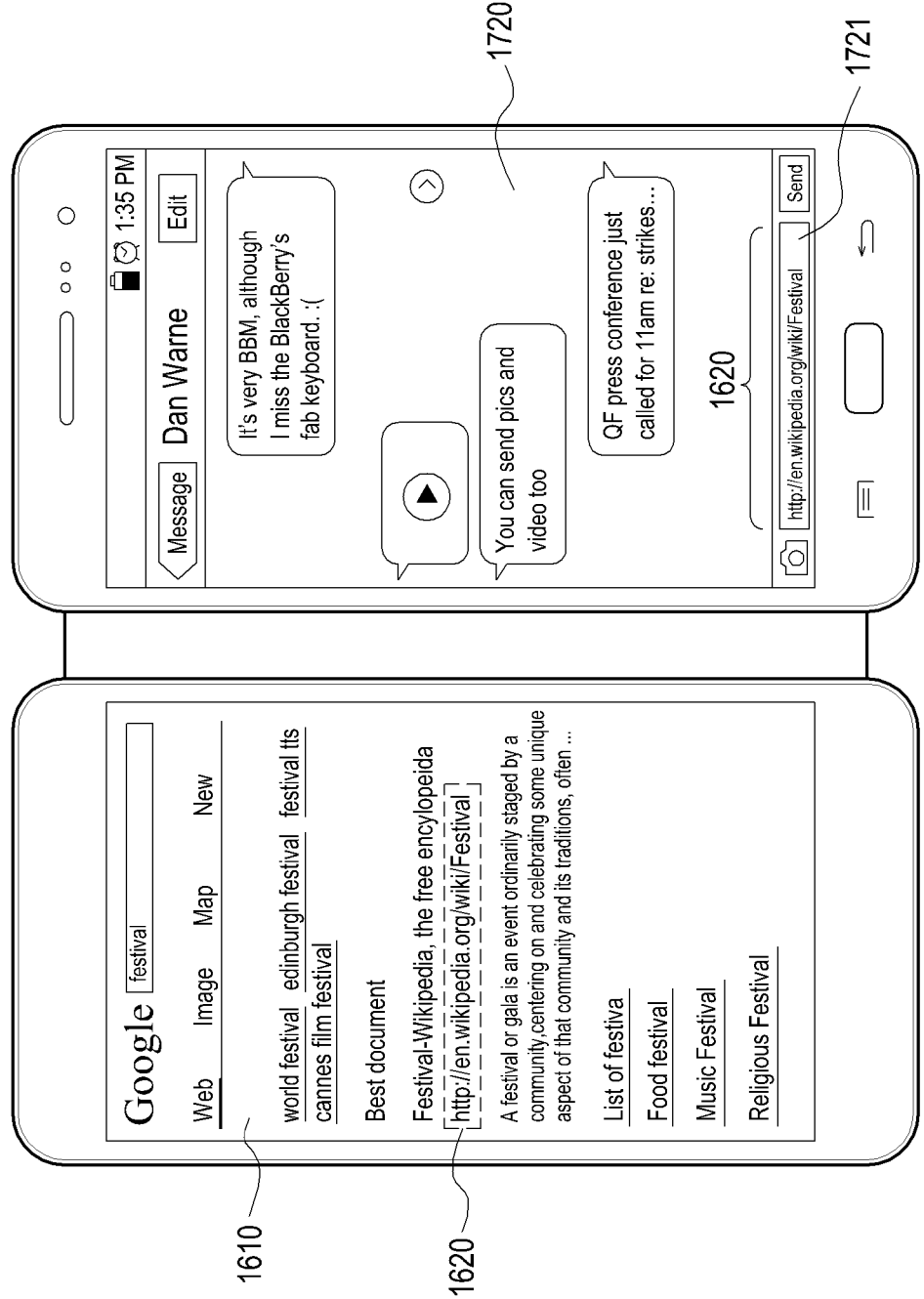
FIG. 17 illustrates another example of processing contents by the electronic device according to various embodiments of the present disclosure.

FIG. 17 illustrates another example of processing the contents by the electronic device according to various embodiments of the present disclosure.

Referring to FIG. 17, when the electronic device 101 is implemented to have dual monitors, the processor 120 temporarily stores the extracted website address 1620 and copies and inputs the website address 1620 into an execution screen 1720 of a different application. For example, the processor 120 may copy the website address 1620 extracted from the browser window 1620 and input the website address 1620 into an input window 1721 of the execution screen 1720.

FIGS. 18A and 18B illustrate another example of processing the contents by the electronic device according to various embodiments of the present disclosure.

Referring to FIGS. 18A and 18B, an example of a hypertext markup language (HTML) document is displayed by a browser application. When text or images included in the Internet page is selected by the processor 120, the selected text or images are stored as a content. The processor 120 may determine the position (for example, a line) of the html document at which the part selected by the user is located. The processor 120 may insert "f727to732f890t932" into a uniform resource locator (URL) corresponding to lines 727-732 and 890-932 of the html document and store the URL or transmit the URL to another external device (for example, the electronic device 102 or 104, or the server 106). For example, the processor 120 may transmit "http://ss.com/253#f28t760f820t884" to another external electronic device. The processor 120 may show images or text corresponding to lines 727-732 and lines 890-932. For example, the processor 120 may control the display 160 to show the corresponding area by scrolling the Internet page to allow the user to intuitively identify the area including the images or texts corresponding to the lines 727-732 and the lines 890-932 by using the URL. Further, the processor 120 may show the area including the images or text corresponding to the lines 727-732 and the lines 890-932 to be in contrast with other areas of the Internet page.

Figures 19A, 19B, 19C:
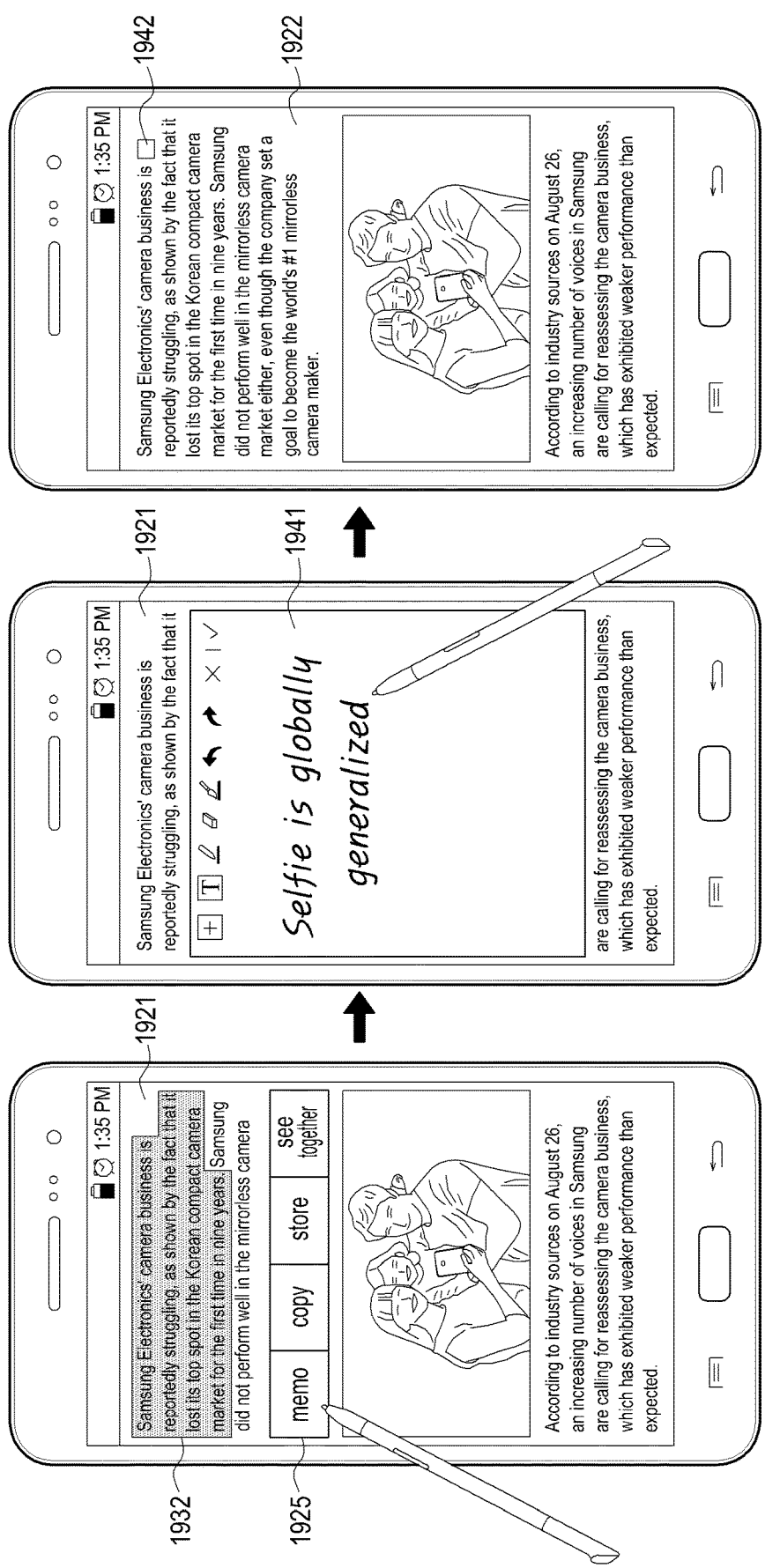
FIGS. 19A, 19B, and 19C illustrate another example of processing contents by the electronic device according to various embodiments of the present disclosure.

FIGS. 19A, 19B, and 19C illustrate another example of processing the contents by the electronic device according to various embodiments of the present disclosure Referring to FIG. 19A, an execution screen 1921 includes a character or text and the user selects text by using the stylus pen 600. Further, the processor 120 may display a menu bar 1925 for processing the selected text 1932. In FIG. 19A, the user selects a "memo" function from the menu bar 1925.

Referring to FIG. 19B, since the memo function is selected, the processor 120 may control the display 160 to float and display a memo window 1940 on the execution screen 1921. The processor 120 may distinguish the text 1932 selected by the user from texts, which are not selected, through the display 160. Further, the electronic device 101 may receive a memo through the user's finger or the stylus pen 600. At this time, the memo may be related to the selected text 1932.

Referring to FIG. 19C, after the memo is completely input, the processor 120 may hide the memo window 1941. Further, the processor 120 may inform the user that the memo related to the text 1932 exists by displaying a memo icon 1942.

Figure 20:
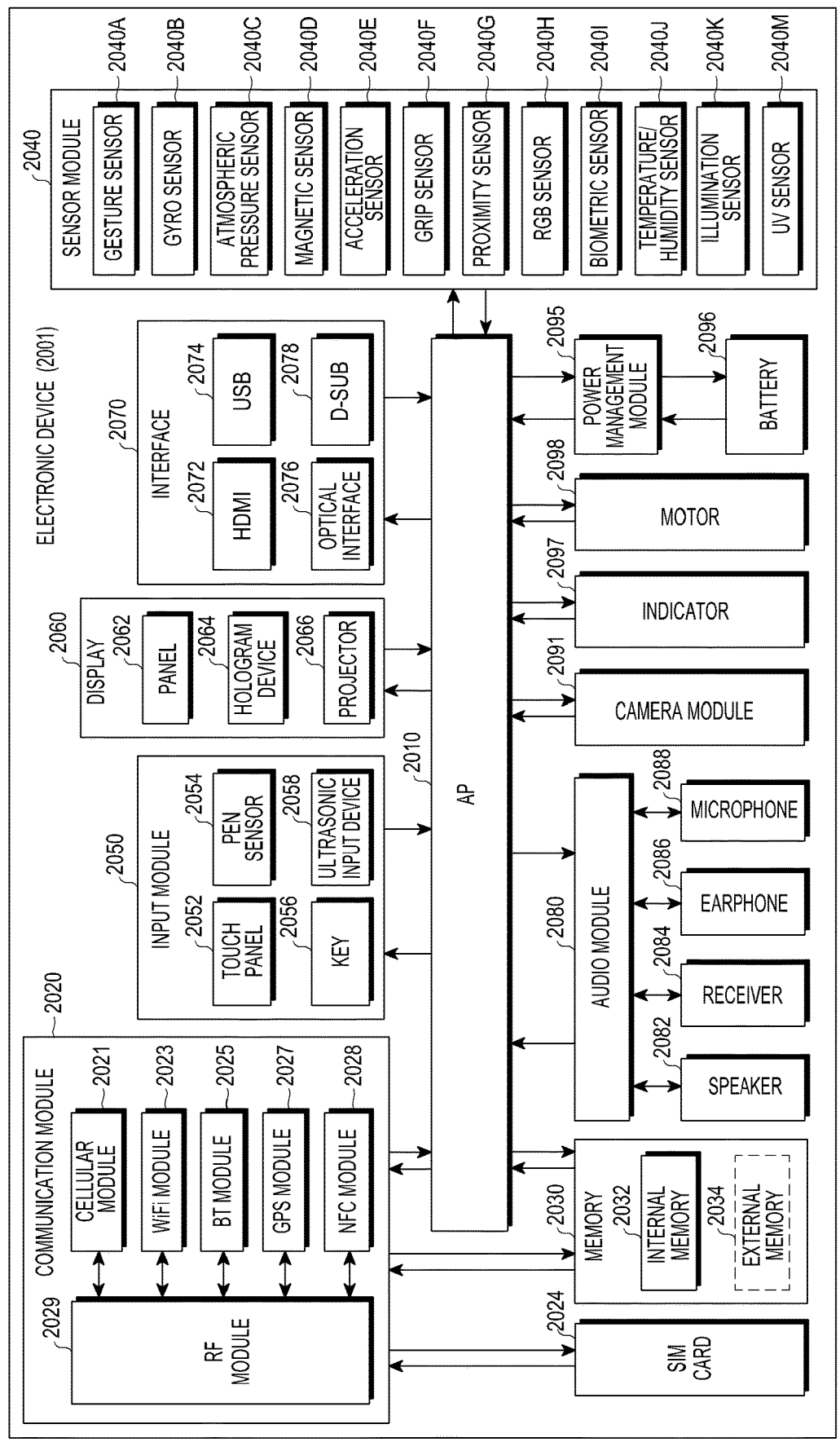
FIG. 20 is a block diagram of an electronic device according to various embodiments of the present disclosure.

FIG. 20 is a block diagram of an electronic device according to various embodiments of the present disclosure.

Referring to FIG. 20, an electronic device 2001 may include, for example, all or some of the electronic device 101 illustrated in FIG. 1. The electronic device 2001 may include at least one AP 2010, a communication module 2020, a subscriber identification module (SIM) card 2024, a memory 2030, a sensor module 2040, an input device 2050, a display 2060, an interface 2070, an audio module 2080, a camera module 2091, a power management module 2095, a battery 2096, an indicator 2097, and a motor 2098.

The AP 2010 may control a plurality of hardware or software components connected thereto by driving an operating system or an application program and perform a variety of data processing and calculations. The AP 2010 may be embodied as, for example, a system on chip (SoC). According to an embodiment, the AP 2010 may further include a graphic processing unit (GPU) and/or an image signal processor. The AP 2010 may include some of the components (for example, the cellular module 2021) illustrated in FIG. 20. The AP 2010 may load instructions or data, received from at least one other element (for example, a non-volatile memory), in a volatile memory to process the loaded instructions or data and may store various types of data in a non-volatile memory.

The communication module 2020 may be similar to the communication interface 200 of FIG. 1. The communication module 2020 may include, for example, a cellular module 2021, a Wi-Fi module 2023, a Bluetooth (BT) module 2025, a GPS module 2027, a near field communication (NFC) module 2028, and a radio frequency (RF) module 2029.

The cellular module 2021 may provide a voice call, image call, short messaging service (SMS), or Internet service through, for example, a communication network. According to an embodiment, the cellular module 2021 may distinguish between and authenticate electronic devices 2001 within a communication network using a subscriber identification module (for example, the SIM card 2024). According to an embodiment of the present disclosure, the cellular module 2021 may perform at least some of functions that the AP 2010 may provide. According to an embodiment of the present disclosure, the cellular module 2021 may include a CP.

The Wi-Fi module 2023, the BT module 2025, the GPS module 2027, and the NFC module 2028 may include, for example, a processor for processing data transmitted/received through the corresponding module. According to any embodiment, at least some (two or more) of the cellular module 2021, the Wi-Fi module 2023, the BT module 2025, the GPS module 2027, and the NFC module 2028 may be included in one integrated chip (IC) or IC package.

The RF module 2029 may transmit/receive, for example, a communication signal (e.g., an RF signal). The RF module 2029 may include, for example, a transceiver, a power amp module (PAM), a frequency filter, a low noise amplifier (LNA), or an antenna. According to another embodiment, at least one of the cellular module 2021, the Wi-Fi module 2023, the BT module 2025, the GPS module 2027, and the NFC module 2028 may transmit/receive an RF signal through a separate RF module 2029.

The SIM card 2024 may include, for example, a card including a subscriber identification module and/or an embedded SIM, and may further include unique identification information (for example, an Integrated Circuit Card Identifier (ICCID)) or subscriber information (for example, International Mobile Subscriber Identity (IMSI)).

The memory 2030 (for example, the memory 130) may include, for example, an internal memory 2032 or an external memory 2034. The internal memory 2032 may include at least one of a volatile memory (for example, a dynamic random access memory (DRAM), a static RAM (SRAM), a synchronous dynamic RAM (SDRAM), and the like) and a non-volatile memory (for example, a one time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory or a NOR flash memory), a hard disc drive, a solid state drive (SSD), and the like).

The external memory 2034 may further include a flash drive, for example, a compact flash (CF), a secure digital (SD), a micro secure digital (Micro-SD), a mini secure digital (Mini-SD), an extreme Digital (xD), a memory stick or the like. The external memory 2034 may be functionally and/or physically connected to the electronic device 2001 through various interfaces.

The sensor module 2040 may measure a physical quantity or detect an operation state of the electronic device 2001, and may convert the measured or detected information to an electrical signal. The sensor module 2040 may include at least one of, for example, a gesture sensor 2040A, a gyro sensor 2404B, an atmospheric pressure sensor 2040C, a magnetic sensor 2040D, an acceleration sensor 2040E, a grip sensor 2040F, a proximity sensor 2040G, a color sensor 2040H (for example, a red/green/blue (RGB) sensor), a biometric sensor 2040I, a temperature/humidity sensor 2040J, an illumination sensor 2040K, and an ultra violet (UV) sensor 2040M. Additionally or alternatively, the sensor module 2040 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2040 may further include a control circuit for controlling at least one sensor included therein. In some embodiments, the electronic device 2001 may further include a processor configured to control the sensor module 2040 as a part of or separately from the AP 2010, and may control the sensor module 2040 while the AP 2010 is in a sleep state.

The input device 2050 may include, for example, a touch panel 2052, a (digital) pen sensor 2054, a key 2056, or an ultrasonic input device 2058. The touch panel 2052 may use at least one of, for example, a capacitive type, a resistive type, an infrared type, and an ultrasonic type. The touch panel 2052 may further include a control circuit. The touch panel 2052 may further include a tactile layer and provide a tactile reaction to the user.

The (digital) pen sensor 2054 may be, for example, a part of the touch panel 2052 or may include a separate recognition sheet. The key 2056 may include, for example, a physical button, an optical key or a keypad. The ultrasonic input unit 2058 may identify data by detecting an acoustic wave with a microphone (for example, microphone 2088) of the electronic device 2001 through an input unit for generating an ultrasonic signal.

The display 2060 (for example, the display 160) may include a panel 2062, a hologram device 2064, or a projector 2066. The panel 2062 may include a component equal or similar to the display 160 of FIG. 1. The panel 2062 may be embodied to be, for example, flexible, transparent, or wearable. The panel 2062 may also be integrated with the touch panel 2052 as a single module. The hologram device 2064 may show a stereoscopic image in the air using interference of light. The projector 2066 may project light onto a screen to display an image. For example, the screen may be located inside or outside the electronic device 2001. According to an embodiment of the present disclosure, the display 2060 may further include a control circuit (not shown) for controlling the panel 2062, the hologram device 2064, or the projector 2066.

The interface 2070 may include, for example, an HDMI 2072, a USB 2074, an optical interface 2076, or a D-sub-miniature (D-sub) 2078. The interface 2070 may be included in, for example, the communication interface 170 illustrated in FIG. 1. Additionally or alternatively, the interface 2070 may include, for example, a mobile high-definition link (MHL) interface, an SD card/multi-media card (MMC) interface, or an infrared data association (IrDA) standard interface.

The audio module 2080 may bilaterally convert, for example, a sound and an electrical signal. At least some components of the audio module 2080 may be included in, for example, the input/output interface 150 illustrated in FIG. 1. The audio module 2080 may process voice information input or output through, for example, a speaker 2082, a receiver 2084, earphones 2086, or the microphone 2088.

The camera module 2091 may photograph a still image and a dynamic image. According to an embodiment, the camera module 291 may include one or more image sensors (for example, a front sensor or a back sensor), a lens, an image signal processor (ISP) or a flash (for example, LED or xenon lamp).

The power management module 2095 may manage, for example, power of the electronic device 2001. According to an embodiment, the power management module 2095 may include a power management integrated circuit (PMIC), a charger IC, or a battery or fuel gauge. The PMIC may have a wired and/or wireless charging scheme. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added. The battery gauge may measure, for example, a residual quantity of the battery 2096, a voltage, a current, or a temperature during charging. The battery 2096 may include, for example, a rechargeable battery or a solar battery.

The indicator 2097 may indicate particular status of the electronic device 2001 or a part thereof (for example, the AP 2010), for example, a booting status, a message status, a charging status, or the like. The motor 2098 may convert an electrical signal into mechanical vibrations, and may generate a vibration or haptic effect. Although not illustrated, the electronic device 2001 may include a processing device (for example, a GPU) for supporting mobile TV. The processing unit for supporting the mobile television (TV) may process media data according to a standard of digital multimedia broadcasting (DMB), digital video broadcasting (DVB), media flow or the like.

Each of the above-described elements of the electronic device 2001 may be implemented by one or more components and the name of the corresponding element may vary depending on the type of the electronic device 2001. In various embodiments of the present disclosure, the electronic device 2001 may include at least one of the above-described elements, and may exclude some of the elements or further include other additional elements. Further, some of the elements of the electronic device 2001 according to various embodiments may be combined into one entity, so that the functions of the corresponding elements may be performed in the same way as those before they are combined.

Figure 21:
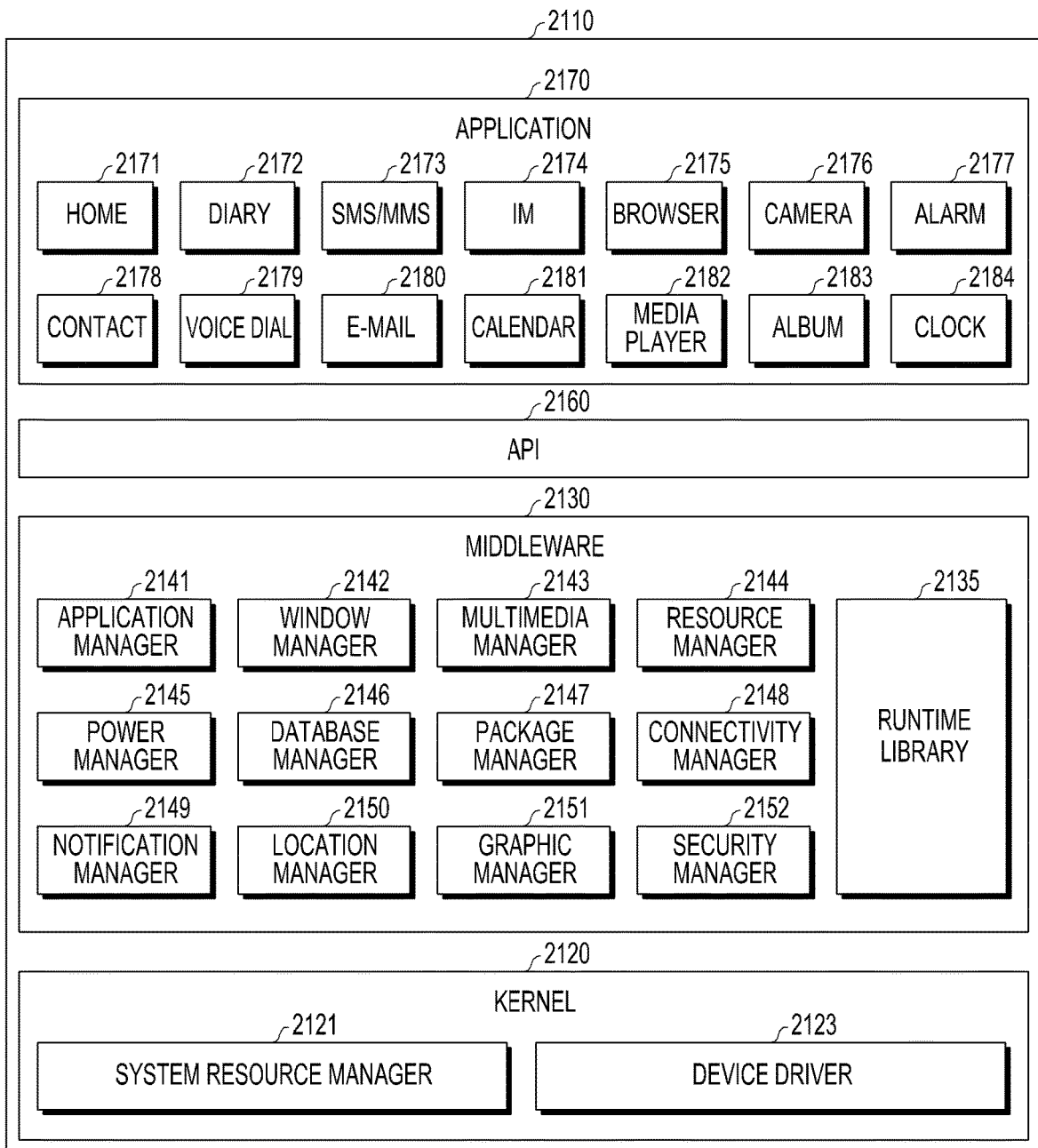
FIG. 21 is a block diagram of a program module according to various embodiments of the present disclosure.

FIG. 21 is a block diagram of a program module according to various embodiments of the present disclosure.

Referring to FIG. 21, a program module 2110 (for example, the program 140) may include an OS for controlling resources related to the electronic device (for example, the electronic device 101) and/or various applications (for example, the application programs 147) executed in the OS. The OS may be, for example, Android®, iOS®, Windows®, Symbian®, Tizen®, Bada®, or the like.

The program module 2110 may include a kernel 2120, middleware 2130, an API 2160, and/or at least one application 2170. At least some of the program module 2110 may be preloaded in the electronic device or downloaded from a server (for example, the server 106).

The kernel 2120 (for example, the kernel 141 of FIG. 1) may include, for example, a system resource manager 2121 or a device driver 2123. The system resource manager 2121 may perform the control, allotment or collection of the system resources. According to an embodiment, the system resource manager 2121 may include a process manager, a memory manager, or a file system manager. The device driver 2123 may include, for example, a display driver, a camera driver, a BT driver, a shared-memory driver, a USB driver, a keypad driver, a Wi-Fi driver, an audio driver, or an inter-process communication (IPC) driver.

The middleware 2130 may provide a function required by the application 2170 through the API 2160 so that the application 2170 can efficiently use limited system resources of the electronic device. According to an embodiment, the middleware 2130 (for example, the middleware 143) may include, for example, at least one of a runtime library 2135, an application manager 2141, a window manager 2142, a multimedia manager 2143, a resource manager 2144, a power manager 2145, a database manager 2146, a package manager 2147, a connectivity manager 2148, a notification manager 2149, a location manager 2150, a graphic manager 2151, and a security manager 2152.

The runtime library 2135 may include, for example, a library module that a compiler uses to add new functions through a programming language while executing the application 2170. The runtime library 2135 may perform input/output management, memory management, or an arithmetic function.

The application manager 2141 may manage, for example, a life cycle of the application 2170. The window manager 2142 may manage a graphical user interface (GUI) resource used in the screen. The multimedia manager 2143 may detect a format required for reproducing various media files and encode or decode a media file using a codec appropriate for the corresponding format. The resource manager 2144 may manage resources such as a source code, a memory or a storage space of the application 2170.

The power manager 2145 may operate together with a basic input/output system (BIOS) to manage a battery or power and may provide power information required for the operation of the electronic device. The database manager 2146 may generate, search for, or change a database to be used by at least one of the applications 2170. The package manager 2147 may manage the installation or the updating of applications distributed in the form of package file.

For example, the connectivity manager 2148 may manage wireless connections, such as Wi-Fi or BT. The notification manager 2149 may display or notify an event such as a received message, an appointment, and a proximity notification to a user without disturbance. The location manager 2150 may manage location information of the electronic device. The graphic manager 2151 may manage graphic effects to be provided to a user and user interfaces. The security manager 2152 may provide various security functions required for system security or user authentication. According to an embodiment, when the electronic device (for example, electronic device 101) has a call function, the middleware 2130 may further include a telephony manager for managing a voice call function or a video call function of the electronic device.

The middleware 2130 may include a middleware module that forms a combination of various functions of the aforementioned components. The middleware 2130 may provide modules specialized according to types of operating systems in order to provide differentiated functions. In addition, the middleware 2130 may dynamically remove the conventional components, or add new components.

The API 2160 (for example, the API 145), which is a set of API programming functions, may include different configurations according to operating systems. For example, with respect to each platform, one API set may be provided in a case of Android or iOS, and two or more API sets may be provided in a case of Tizen®.

The at least one application 2170 (for example, the applications 147) may include one or more of a home application 2171, a diary application 2172, an SMS/multimedia message service (MMS) application 2173, an instant message (IM) application 2174, a browser application 2175, a camera application 2176, an alarm application 2177, a contact application 2178, a voice dial application 2179, an e-mail application 2180, a calendar application 2181, a media player application 2182, an album application 2183, a clock application 2184, a health care application (for example, an application for measuring a work rate or blood sugar) (not shown), and an environmental information application (for example, an application for providing atmospheric pressure, humidity, or temperature information) (not shown).

According to an embodiment, the applications 2170 may include an application (hereinafter, referred to as an "information exchange application" for convenience of the description) supporting information exchange between the electronic device (for example, the electronic device 101) and external electronic devices (for example, the electronic devices 102 and 104). The information exchange application may include, for example, a notification relay application for transmitting specific information to the external electronic device, or a device management application for managing the external electronic device.

For example, the notification relay application may include a function of transferring, to the external electronic device (for example, the electronic device 102 or 104), notification information generated from other applications of the electronic device 101 (for example, an SMS/MMS application, an e-mail application, a health management application, or an environmental information application). Further, the notification relay application may receive notification information from, for example, the external electronic device and provide the received notification information to the user. The device management application may manage (for example, install, delete, or update), for example, a function for at least a part of the external electronic device (for example, the electronic device 104) communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

According to an embodiment, the applications 2170 may include an application (for example, health management application) designated according to attributes (for example, attributes of the electronic device such as the type of electronic device which corresponds to a mobile medical device) of the external electronic device (for example, the electronic device 102 or 104). According to an embodiment, the applications 2170 may include an application received from the external electronic device (for example, the server 106, or the electronic device 102 or 104). According to an embodiment, the applications 2170 may include a preloaded application or a third party application that can be downloaded from the server. Names of the components of the program module 2110 according to the above described embodiments may vary depending on the type of operating system.

According to various embodiments, at least some of the programming module 2110 may be implemented in software, firmware, hardware, or a combination of two or more thereof. At least some of the programming module 2110 may be implemented (for example, executed) by, for example, the processor (for example, the AP 2010). At least some of the programming module 2110 may include, for example, a module, program, routine, sets of instructions, or process for performing one or more functions.

In accordance with an aspect of the present disclosure, a machine-readable storage medium recording a program for executing a method of processing a content by an electronic device is provided. The method includes: generating a content corresponding to a user input among one or more contents displayed through a display of the electronic device as a first content; and displaying a floating UI, which displays first scrap information on the first content, on a screen.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors (for example, the processor 120), the one or more processors may execute a function corresponding to the command. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile communication device comprising:
 a touch screen;
 a processor; and
 a memory storing instructions which, when executed by the processor, cause the mobile communication device to:
  display a first execution screen of a first application, wherein the first execution screen includes a plurality of types of content,
  receive a first user input for capturing at least a portion of the displayed first execution screen,
  based on the first user input being received, capture an image corresponding to the at least the portion of the first execution screen and display a floating user interface (UI) including a representation of the captured image corresponding to the at least the portion of the first execution screen over the first execution screen,
  receive a second user input for selecting the floating UI, the floating UI indicating that the captured image is stored at the mobile communication device, wherein at least one function to be performed in association with the captured image is provided by selecting the floating UI, and
  based on the second user input being received, display at least one UI item corresponding to the at least one function associated with the captured image,
 wherein the at least one UI item is displayed together with the captured image, and
 wherein the at least one UI item comprises a UI item for performing text extraction, the UI item being enabled for receiving a user input for extracting text from the captured image when the captured image includes text, and the UI item being disabled when the captured image does not include text.

2. The mobile communication device of claim 1, wherein the instructions further cause the mobile communication device to:
- based on the second user input being received, display the captured image in a form of a popup window.

3. The mobile communication device of claim 1, wherein the plurality of types of content include at least one image and text.

4. The mobile communication device of claim 1, wherein the floating UI includes a thumbnail of the captured image.

5. The mobile communication device of claim 1, wherein the instructions further cause the mobile communication device to display an icon for receiving the user input for extracting text from the captured image.

6. A method by a mobile communication device, the method comprising:
- displaying a first execution screen of a first application, wherein the first execution screen includes a plurality of types of content;
- receiving a first user input for capturing at least a portion of the displayed first execution screen;
- based on the first user input being received, capturing an image corresponding to the at least the portion of the first execution screen and displaying a floating user interface (UI) including a representation of the captured image corresponding to the at least the portion of the first execution screen over the first execution screen;
- receiving a second user input for selecting the floating UI, the floating UI indicating that the captured image is stored at the mobile communication device, wherein at least one function to be performed in association with the captured image is provided by selecting the floating UI; and
- based on the second user input being received, displaying at least one UI item corresponding to the at least one function associated with the captured image, wherein the at least one UI item is displayed together with the captured image, and
- wherein the at least one UI item comprises a UI item for performing text extraction, the UI item being enabled for receiving a user input for extracting text from the captured image when the captured image includes text, and the UI item being disabled when the captured image does not include text.

7. The mobile communication device of claim 1, wherein the instructions further cause the mobile communication device to refrain from displaying an icon for receiving the user input for extracting text from the captured image.

8. The mobile communication device of claim 5, wherein the instructions further cause the mobile communication device to:
- receive a third user input for selecting the icon for receiving the user input for extracting text from the captured image, and
- based on the third user input being received, display text extracted from the captured image and at least one icon for processing at least a portion of the extracted text.

9. The method of claim 6, further comprising:
- based on the second user input being received, displaying the captured image in a form of a popup window.

10. The method of claim 6, wherein the plurality of types of content include at least one image and text.

11. The method of claim 6, wherein the floating UI includes a thumbnail of the captured image.

12. The method of claim 6, wherein enabling the UI item for receiving the user input for extracting text from the captured image includes displaying an icon for receiving the user input for extracting text from the captured image.

13. The method of claim 12, further comprising:
- receiving a third user input for selecting the icon for receiving the user input for extracting text from the captured image; and
- based on the third user input being received, displaying text extracted from the captured image and at least one icon for processing at least a portion of the extracted text.

14. The method of claim 6, wherein disabling the UI item includes refraining from displaying an icon for receiving the user input for extracting text from the captured image.

15. A non-transitory machine-readable storage medium recording program instructions, wherein the program instructions, when executed by a mobile communication device, cause the mobile communication device to perform at least one operation, the at least one operation comprising:
- displaying a first execution screen of a first application, wherein the first execution screen includes a plurality of types of content;
- receiving a first user input for capturing at least a portion of the displayed first execution screen;
- based on the first user input being received, capturing an image corresponding to the at least the portion of the first execution screen and displaying a floating user interface (UI) including a representation of the captured image corresponding to the at least the portion of the first execution screen over the first execution screen;
- receiving a second user input for selecting the floating UI, the floating UI indicating that the captured image is stored at the mobile communication device, wherein at least one function to be performed in association with the captured image is provided by selecting the floating UI; and
- based on the second user input being received, displaying at least one UI item corresponding to the at least one function associated with the captured image, wherein the at least one UI item is displayed together with the captured image, and
- wherein the at least one UI item comprises a UI item for performing text extraction, the UI item being enabled for receiving a user input for extracting text from the captured image when the captured image includes text, and the UI item being disabled when the captured image does not include text.

16. The non-transitory machine-readable storage medium of claim 15, wherein the at least one operation further comprises:
- based on the second user input being received, displaying the captured image in a form of a popup window.

17. The non-transitory machine-readable storage medium of claim 15, wherein the plurality of types of content include at least one image and text.

18. The non-transitory machine-readable storage medium of claim 15, wherein the floating UI includes a thumbnail of the captured image.

19. The non-transitory machine-readable storage medium of claim 15, wherein enabling the UI item for receiving the user input for extracting text from the captured image includes displaying an icon for receiving the user input for extracting text from the captured image.

20. The non-transitory machine-readable storage medium of claim 19, wherein the at least one operation further comprises:

receiving a third user input for selecting the icon for receiving the user input for extracting text from the captured image; and based on the third user input being received, displaying text extracted from the captured image and at least one icon for processing at least a portion of the extracted text.

21. The non-transitory machine-readable storage medium of claim 15, wherein disabling the UI item includes refraining from displaying an icon for receiving the user input for extracting text from the captured image.

22. A mobile communication device comprising:
a touch screen;
a processor; and
a memory storing instructions which, when executed by the processor, cause the mobile communication device to:
  display a first execution screen of a first application, wherein the first execution screen includes a plurality of types of content,
  receive a first user input for capturing at least a portion of the displayed first execution screen,
  based on the first user input being received, capture an image corresponding to the at least the portion of the first execution screen and display a floating user interface (UI) including a representation of the captured image corresponding to the at least the portion of the first execution screen over the first execution screen,
  receive a second user input for selecting the floating UI, the floating UI indicating that the captured image is stored at the mobile communication device, wherein a plurality of functions to be performed in association with the captured image are provided by selecting the floating UI, and
  based on the second user input being received, display a plurality of UI items corresponding to the plurality of functions associated with the captured image,
wherein the plurality of UI items are displayed together with the captured image, and
wherein the plurality of UI items comprises a UI item for performing text extraction when the captured image includes text, and the plurality of UI items do not comprise the UI item when the captured image does not include text.

\* \* \* \* \*